(12) United States Patent
Iwakiri et al.

(10) Patent No.: US 12,435,730 B2
(45) Date of Patent: Oct. 7, 2025

(54) IMPELLER OF CENTRIFUGAL COMPRESSOR AND CENTRIFUGAL COMPRESSOR

(71) Applicant: MITSUBISHI HEAVY INDUSTRIES ENGINE & TURBOCHARGER, LTD., Sagamihara (JP)

(72) Inventors: Kenichiro Iwakiri, Tokyo (JP); Yutaka Fujita, Tokyo (JP); Tadashi Kanzaka, Tokyo (JP); Hironori Honda, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/015,816

(22) PCT Filed: Aug. 5, 2020

(86) PCT No.: PCT/JP2020/030031
§ 371 (c)(1),
(2) Date: Jan. 12, 2023

(87) PCT Pub. No.: WO2022/029932
PCT Pub. Date: Feb. 10, 2022

(65) Prior Publication Data
US 2023/0258197 A1 Aug. 17, 2023

(51) Int. Cl.
*F04D 29/28* (2006.01)
*F04D 17/10* (2006.01)
(Continued)

(52) U.S. Cl.
CPC ........... *F04D 29/284* (2013.01); *F04D 17/10* (2013.01); *F04D 29/30* (2013.01); *F04D 29/441* (2013.01);
(Continued)

(58) Field of Classification Search
CPC ...... F04D 29/284; F04D 29/30; F04D 29/441; F04D 17/10; F05D 2240/304; F05D 2220/40; F01D 5/048
See application file for complete search history.

(56) References Cited

U.S. PATENT DOCUMENTS

2002/0106277 A1   8/2002   Chapman
2008/0229742 A1   9/2008   Renaud et al.
(Continued)

FOREIGN PATENT DOCUMENTS

CN   1111727 A   11/1995
CN   1478178 A   2/2004
(Continued)

OTHER PUBLICATIONS

International Preliminary Report on Patentability and English translation of the Written Opinion of the International Searching Authority for International Application No. PCT/JP2020/030031, dated Feb. 16, 2023.
(Continued)

*Primary Examiner* — Courtney D Heinle
*Assistant Examiner* — Jesse M Prager
(74) *Attorney, Agent, or Firm* — Birch, Stewart, Kolasch & Birch, LLP

(57) ABSTRACT

An impeller of a centrifugal compressor includes: a hub; and at least one blade disposed on a hub surface of the hub. A hub-side end of a trailing edge of the at least one blade is located radially outward of an outer peripheral portion of the hub, and is located on either of a first line extending radially outward from the hub surface of the hub or a second line extending radially outward from a back surface of the hub.

6 Claims, 19 Drawing Sheets

(51) Int. Cl.
*F04D 29/30* (2006.01)
*F04D 29/44* (2006.01)

(52) U.S. Cl.
CPC .... *F05D 2220/40* (2013.01); *F05D 2240/304* (2013.01)

(56) References Cited

U.S. PATENT DOCUMENTS

| | | |
|---|---|---|
| 2010/0150723 A1 | 6/2010 | Rojanskiy et al. |
| 2010/0322781 A1 | 12/2010 | Heyes et al. |
| 2012/0263599 A1 | 10/2012 | Sugimura et al. |
| 2015/0369073 A1 | 12/2015 | Japikse |
| 2017/0016457 A1 | 1/2017 | Japikse |
| 2018/0258950 A1 | 9/2018 | Japikse |
| 2019/0154056 A1* | 5/2019 | Godo ................. F04D 29/4226 |

FOREIGN PATENT DOCUMENTS

| | | | |
|---|---|---|---|
| CN | 104314863 A | * | 1/2015 |
| CN | 104653511 A | * | 5/2015 |
| CN | 106574636 A | | 4/2017 |
| DE | 10 2013 209 063 A1 | | 3/2014 |
| JP | 54-93802 U | | 7/1979 |
| JP | 4-136499 A | | 5/1992 |
| JP | 6-2698 A | | 1/1994 |
| JP | 2009-221984 A | | 10/2009 |
| JP | 2009-541641 A | | 11/2009 |
| JP | 2011-512479 A | | 4/2011 |
| JP | 5730649 B2 | | 6/2015 |
| JP | 2015-194091 A | | 11/2015 |
| JP | 2017-523338 A | | 8/2017 |
| KR | 20030020502 A | * | 3/2003 |
| WO | WO 2007/022648 A1 | | 3/2007 |
| WO | WO2015/082624 A1 | | 6/2015 |
| WO | WO-2020040774 A1 * | 2/2020 | ............. F04D 21/00 |

OTHER PUBLICATIONS

International Search Report for International Application No. PCT/JP2020/030031, dated Sep. 29, 2020.
Japanese Office Action for Japanese Application No. 2024-048841, dated Oct. 8, 2024, with English translation.
Chinese Office Action and Search Report for Chinese Application No. 202080103036.6, dated Jul. 18, 2025, with English translation of the Office Action.

* cited by examiner

IMPELLER OF CENTRIFUGAL COMPRESSOR AND CENTRIFUGAL COMPRESSOR

TECHNICAL FIELD

The present disclosure relates to an impeller of a centrifugal compressor and the centrifugal compressor.

BACKGROUND

Patent Document 1 discloses a configuration of a centrifugal compressor of a turbomachinery for the purpose of suppressing a secondary flow and improving performance of the turbomachinery.

In this configuration, an impeller includes a hub plate, and a plurality of blades circumferentially disposed at intervals on one surface side of the hub plate. Each of the plurality of blades has a shape formed by piling up a plurality of blade sections in a blade height-wise direction of each blade in a reference impeller in which the hub plate intersects with the blades and which includes a blade configured by a linear element in the blade height-wise direction so as to form a curvilinear element blade. In piling up the blade sections in the blade height-wise direction, an amount of the tangential lean to be applied to the blade sections is increased as it goes from an end face of at least one of a hub plate side end and a counter hub plate side end toward a span intermediate part of the blade.

CITATION LIST

Patent Literature

Patent Document 1: JP5730649B

SUMMARY

Technical Problem

Meanwhile, in a centrifugal compressor, if an outer diameter of an impeller is reduced, the inertia of the impeller can be reduced by reducing the weight of the impeller. For example, if the centrifugal compressor is used for a turbocharger, response of the turbocharger can be improved by reducing the inertia of the impeller. However, in the centrifugal compressor, the pressure ratio tends to decrease as the outer diameter of the impeller is reduced, making it uneasy to suppress the decrease in pressure ratio with a low-weight impeller.

Further, in the centrifugal compressor, a clearance flow is generated in which part of air compressed by rotation of the impeller flows from an outlet of the impeller to a clearance between a back surface of the impeller and a housing. As the clearance flow increases, efficiency of the centrifugal compressor decreases.

Patent Document 1 described above does not disclose knowledge for solving these problems in the centrifugal compressor.

In view of the above, an object of the present disclosure is to provide an impeller of a centrifugal compressor and the centrifugal compressor capable of suppressing a decrease in pressure ratio with low weight and further capable of improving efficiency by suppressing clearance flow.

Solution to Problem

In order to achieve the above-described object, an impeller of a centrifugal compressor according to at least one embodiment of the present disclosure is an impeller of a centrifugal compressor, including: a hub; and at least one blade disposed on a hub surface of the hub. A hub-side end of a trailing edge of the at least one blade is located radially outward of an outer peripheral portion of the hub, and is located on either of a first line extending radially outward from the hub surface of the hub or a second line extending radially outward from a back surface of the hub.

Advantageous Effects

According to the present disclosure, an impeller of a centrifugal compressor and the centrifugal compressor are provided which is capable of suppressing a decrease in pressure ratio with low weight and is further capable of improving efficiency by suppressing clearance flow.

DETAILED DESCRIPTION

Figure 1:
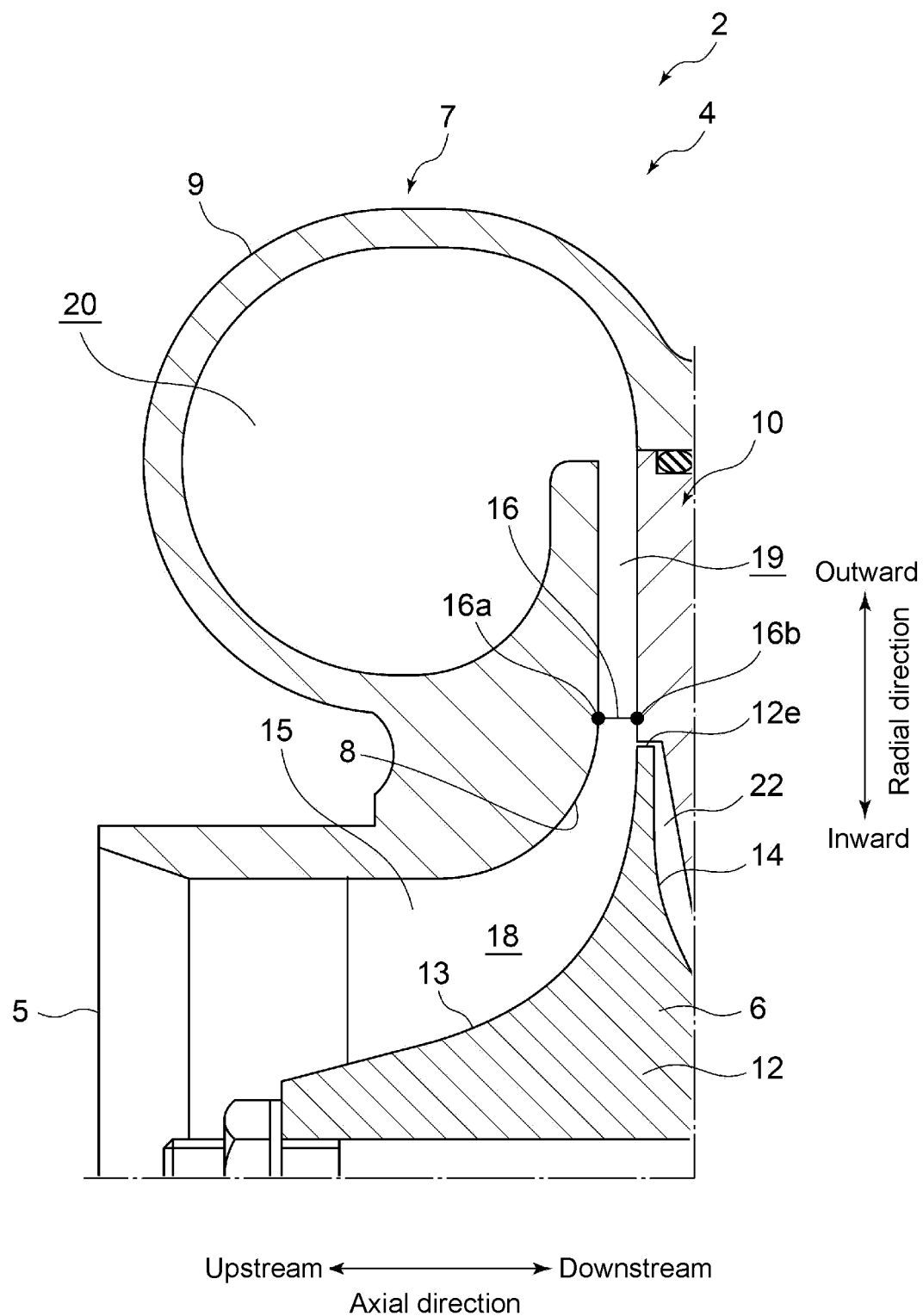
FIG. 1 is a schematic cross-sectional view of a centrifugal compressor 4 of a turbocharger 2 along the axial direction according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a schematic cross-sectional view of a centrifugal compressor 4 of a turbocharger 2 along the axial direction according to an embodiment.

As shown in FIG. 1, the centrifugal compressor 4 includes an impeller 6, a casing 7 for accommodating the impeller 6, and a housing 10 for accommodating a bearing (not shown) for rotatably supporting the impeller 6.

The impeller 6 includes a hub 12, and at least one blade 15 disposed on a hub surface 13 of the hub 12. In the present embodiment, the impeller 6 includes the plurality of blades disposed on the hub surface 3 at intervals in the circumferential direction of the impeller 6. Herein, the hub surface 13 is a surface of the hub 12 opposite to the casing 7 and means a curved surface smoothly curved into a concave shape along the blade 15. Hereinafter, the circumferential direction of the impeller 6 is simply referred to as the "circumferential direction", the axial direction of the impeller 6 (a direction along a rotational axis of the impeller 6) is simply referred to as the "axial direction", and the radial direction of the impeller 6 is simply referred to as the "radial direction".

The casing 7 includes a shroud portion 8 surrounding the plurality of blades 15 of the impeller 6, and a scroll portion 9 forming a scroll flow passage 20 on an outer peripheral side of the impeller 6.

An air flow passage 18 is formed between the impeller 6 and the shroud portion 8. Air (fluid) having flowed into the air flow passage 18 from an air inlet 5 of the centrifugal compressor 4 is compressed by the impeller 6 and flows through a diffuser flow passage 19 on the downstream side of the air flow passage 18 to the scroll flow passage 20. The diffuser flow passage 19 through which the air compressed by the impeller 6 flows is defined by a shroud sidewall surface 50 of the casing 7 and a hub-side wall surface 26 of the housing 10. A clearance 22 is formed between the hub 12 of the impeller 6 and the housing 10.

As shown in FIG. 1, assuming that a position closest to the shroud portion 8 at a trailing edge 16 of the blade 15 is a shroud-side end 16a of the trailing edge 16 and a position closest to the hub 12 at the trailing edge 16 of the blade 15 is a hub-side end 16b of the trailing edge 16, the hub-side end 16b of the trailing edge 16 is located radially outward of an outer peripheral portion 12e of the hub 12. In the illustrated form, the entire trailing edge 16 is located radially outward of the outer peripheral portion 12e of the hub 12. Herein, the outer peripheral portion 12e of the hub 12 means a radially outer end portion of the hub 12, that is, a portion connecting the hub surface 13 of the hub 12 and a back surface 14 of the hub 12.

Figure 2:
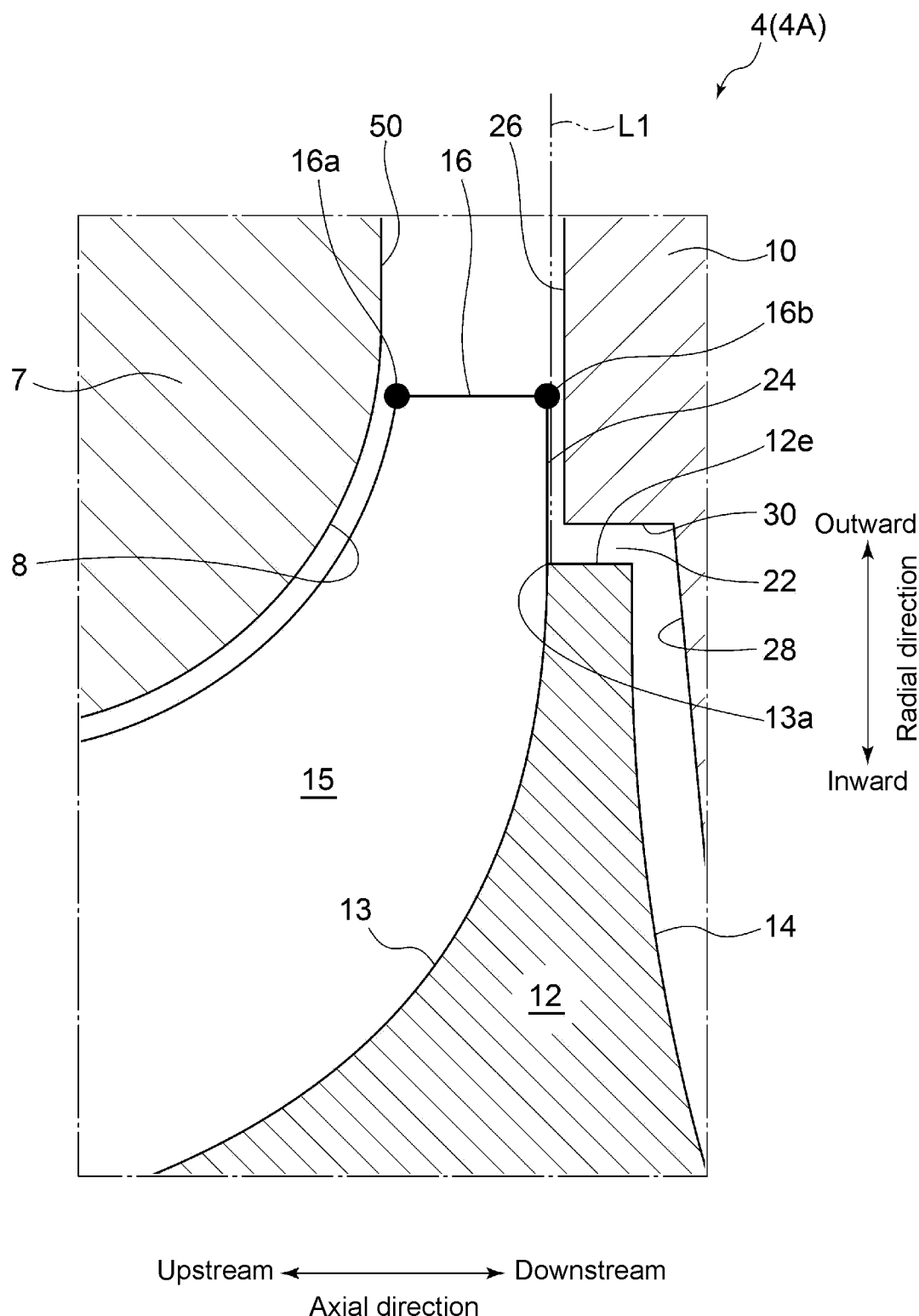
FIG. 2 is a schematic cross-sectional view of the centrifugal compressor 4 (4A) along the axial direction according to an embodiment, and shows an example of the detailed configuration of the centrifugal compressor 4 shown in FIG. 1.

FIG. 2 is a schematic cross-sectional view of the centrifugal compressor 4 (4A) along the axial direction according to an embodiment, and shows an example of the detailed configuration of the centrifugal compressor 4 shown in FIG. 1.

As shown in FIG. 2, assuming that a line extending radially outward from the hub surface 13 of the hub 12 is a first line L1 (first line), the hub-side end 16b of the trailing edge 16 is located on the first line L1. In the form shown in FIG. 2, the first line L1 is a straight imaginary line which extends radially outward from the outer peripheral end 13*a* of the hub surface 13 and is along a tangential direction of the hub surface 13.

The blade 15 includes a blade root outer peripheral portion 24 connecting the hub-side end 16*b* of the trailing edge 16 and the outer peripheral portion 12*e* of the hub 12. In the illustrated exemplary form, the blade root outer peripheral portion 24 extends along the first line L1 so as to connect the hub-side end 16*b* of the trailing edge 16 and the outer peripheral end 13*a* of the hub surface 13. Further, the trailing edge 16 is formed along the axial direction and extends parallel to the axial direction.

The housing 10 includes a hub-side wall surface 26 opposite to the blade root outer peripheral portion 24, a back-side wall surface 28 opposite to the back surface 14 of the impeller 6, and a step surface 30 extending along the axial direction so as to connect the hub-side wall surface 26 and the back-side wall surface 28. The step surface 30 is an opposite wall surface opposite to the outer peripheral portion 12*e* of the hub 12. The blade root outer peripheral portion 24 is formed along the hub-side wall surface 26 and extends parallel to the hub-side wall surface 26.

According to the configuration shown in FIG. 2, the hub-side end 16*b* of the trailing edge 16 is located radially outward of the outer peripheral portion 12*e* of the hub 12 (the outer peripheral end of the hub 12). Thus, compared with the configuration where the outer diameter of the impeller 6 is the same as that in the configuration shown in FIG. 2 and a radial position of the outer peripheral end 13*a* of the hub surface 13 is enlarged to a radial position of the hub-side end 16*b* of the trailing edge 16, it is possible to reduce the weight of the impeller 6 while suppressing a decrease in pressure ratio of the centrifugal compressor 4. Further, compared with the configuration where the outer diameter of the hub 12 is the same as that in the configuration shown in FIG. 2 and the radial position of the hub-side end 16*b* of the trailing edge 16 is reduced to the radial position of the outer peripheral end 13*a* of the hub surface 13, it is possible to suppress an increase in weight of the impeller while suppressing an increase in pressure ratio of the centrifugal compressor 4. Thus, it is possible to suppress the decrease in pressure ratio with the low-weight impeller. Further, since the diameter of the clearance 22 is also reduced by reducing the outer diameter of the hub 12, it is possible to suppress the clearance flow and reduce the clearance loss.

Furthermore, the hub-side end 16*b* of the trailing edge 16 is located on the first line L1 extending radially outward from the hub surface 13. Thus, the blade 15 of the impeller 6 covers the clearance 22 between the hub 12 and the housing 10, and as the impeller 6 rotates, a centrifugal force acts on air in the vicinity of an inlet of the clearance 22 (a gap between the housing 10 and the outer peripheral portion 12*e* of the hub 12), making it possible to further enhance an effect of suppressing inflow of the clearance flow into the clearance 22.

Thus, according to the impeller 6 of the centrifugal compressor 4 (4A), it is possible to suppress the decrease in pressure ratio of the centrifugal compressor 4 with low weight, and further it is possible to improve efficiency of the centrifugal compressor 4 by suppressing the clearance flow.

Figure 3:
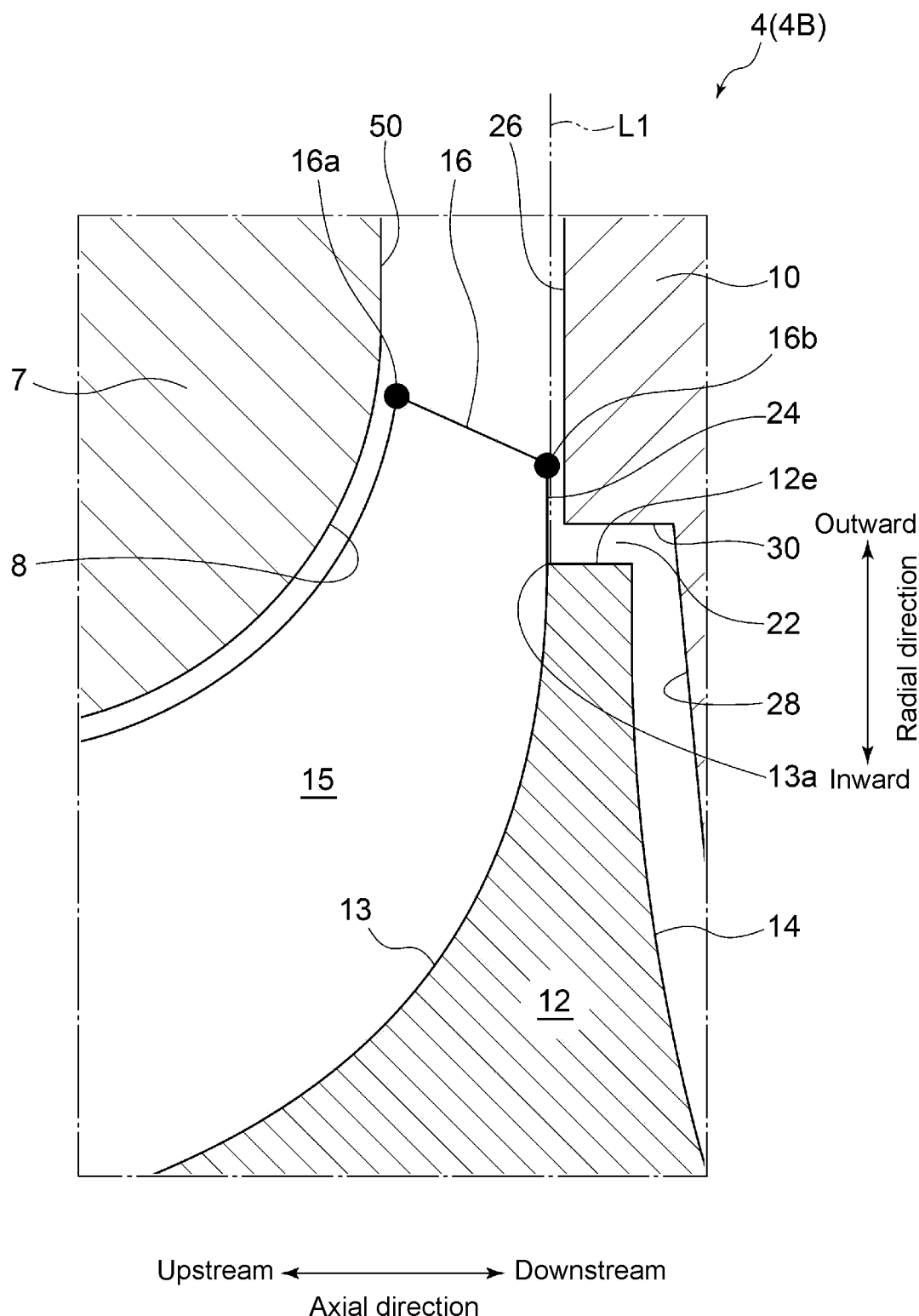
FIG. 3 is a schematic cross-sectional view of the centrifugal compressor 4 (4B) along the axial direction according to an embodiment, and shows an example of the detailed configuration of the centrifugal compressor 4 shown in FIG. 1.

FIG. 3 is a schematic cross-sectional view of the centrifugal compressor 4 (4B) along the axial direction according to an embodiment, and shows an example of the detailed configuration of the centrifugal compressor 4 shown in FIG. 1. In the configuration shown in FIG. 3, a reference sign common to each configuration shown in FIG. 2 denotes the same configuration as each configuration shown in FIG. 2 unless otherwise specified, and the description thereof is omitted.

The configuration shown in FIG. 3 differs from the configuration shown in FIG. 2 in that the trailing edge 16 is inclined radially inward toward the hub 12 side. That is, in the impeller 6 of the centrifugal compressor 4 (4B), the trailing edge 16 is inclined with respect to the axial direction and linearly extends such that the shroud-side end 16*a* is located radially outward of the hub-side end 16*b*. The shroud portion 8 side of the trailing edge 16 protrudes radially outward of the hub 12 side of the trailing edge.

Figure 4:
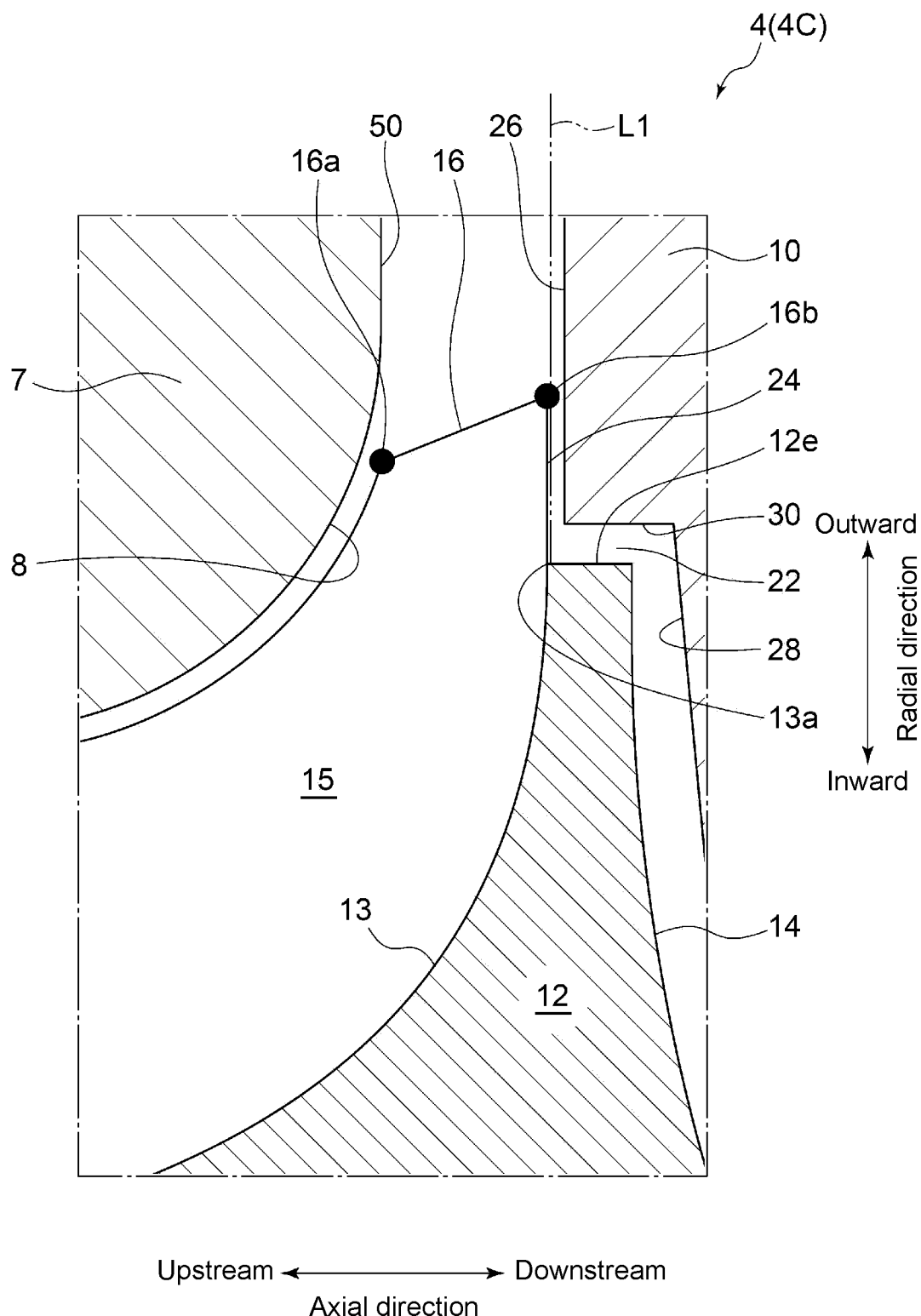
FIG. 4 is a schematic cross-sectional view of the centrifugal compressor 4 (4C) along the axial direction according to an embodiment, and shows an example of the detailed configuration of the centrifugal compressor 4 shown in FIG. 1.

FIG. 4 is a schematic cross-sectional view of the centrifugal compressor 4 (4C) along the axial direction according to an embodiment, and shows an example of the detailed configuration of the centrifugal compressor 4 shown in FIG. 1. In the configuration shown in FIG. 4, a reference sign common to each configuration shown in FIG. 2 denotes the same configuration as each configuration shown in FIG. 2 unless otherwise specified, and the description thereof is omitted.

The configuration shown in FIG. 4 differs from the configuration shown in FIG. 2 in that the trailing edge 16 is inclined radially outward toward the hub 12 side. That is, in the impeller 6 of the centrifugal compressor 4 (4C), the trailing edge 16 is inclined with respect to the axial direction and linearly extends such that the shroud-side end 16*a* is located radially inward of the hub-side end 16*b*. The hub 12 side of the trailing edge 16 protrudes radially outward of the shroud portion 8 side of the trailing edge 16.

Figure 5:
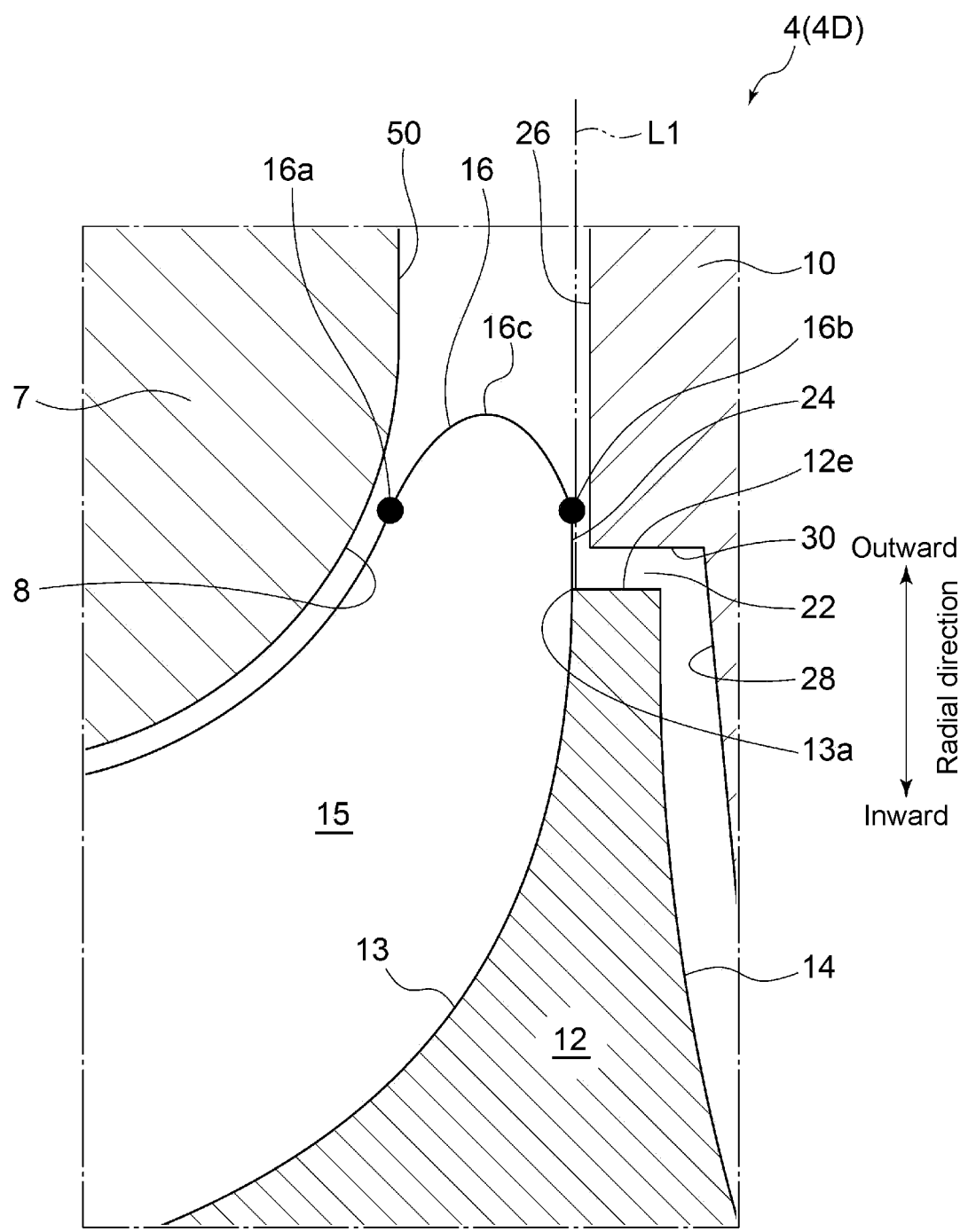
FIG. 5 is a schematic cross-sectional view of the centrifugal compressor 4 (4D) along the axial direction according to an embodiment, and shows an example of the detailed configuration of the centrifugal compressor 4 shown in FIG. 1.

FIG. 5 is a schematic cross-sectional view of the centrifugal compressor 4 (4D) along the axial direction according to an embodiment, and shows an example of the detailed configuration of the centrifugal compressor 4 shown in FIG. 1. In the configuration shown in FIG. 5, a reference sign common to each configuration shown in FIG. 2 denotes the same configuration as each configuration shown in FIG. 2 unless otherwise specified, and the description thereof is omitted.

The configuration shown in FIG. 5 differs from the configuration shown in FIG. 2 in that the trailing edge 16 is smoothly curved to be directed radially outward from the shroud-side end 16*a* toward a central portion 16*c* of the trailing edge 16 and to be directed radially inward from the central portion 16*c* toward the hub-side end 16*b* of the trailing edge 16. That is, in the impeller 6 of the centrifugal compressor 4 (4D), the trailing edge 16 is smoothly curved such that the central portion 16*c* of the trailing edge 16 is located radially outward of each of the shroud-side end 16*a* and the hub-side end 16*b* of the trailing edge 16.

In any of the centrifugal compressors 4 (4B to 4D) shown in FIGS. 3 to 5, the hub-side end 16*b* of the trailing edge 16 is located radially outward of the outer peripheral portion 12*e* of the hub 12 (the outer peripheral end of the hub 12), and the hub-side end 16*b* of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Further, since the trailing edge 16 is located radially outward of the outer peripheral portion 12*e* of the hub 12, the increase in outer diameter of the impeller 6 increases a total pressure. Thus, by adjusting the shape of the portion of the blade 15 protruding from the outer peripheral portion 12*e* of the hub 12 as shown in FIGS. 3 to 5, a non-uniform total pressure distribution caused in the impeller 6 is uniformed, making it possible to suppress the occurrence of separation in the diffuser flow passage 19. Especially in the centrifugal compressor 4 (4B) shown in FIG. 3 and the centrifugal compressor 4 (4D) shown in FIG. 5, as a result of decreasing the mass of the hub 12, it is possible to reduce a centrifugal stress acting on the hub.

Figure 6:
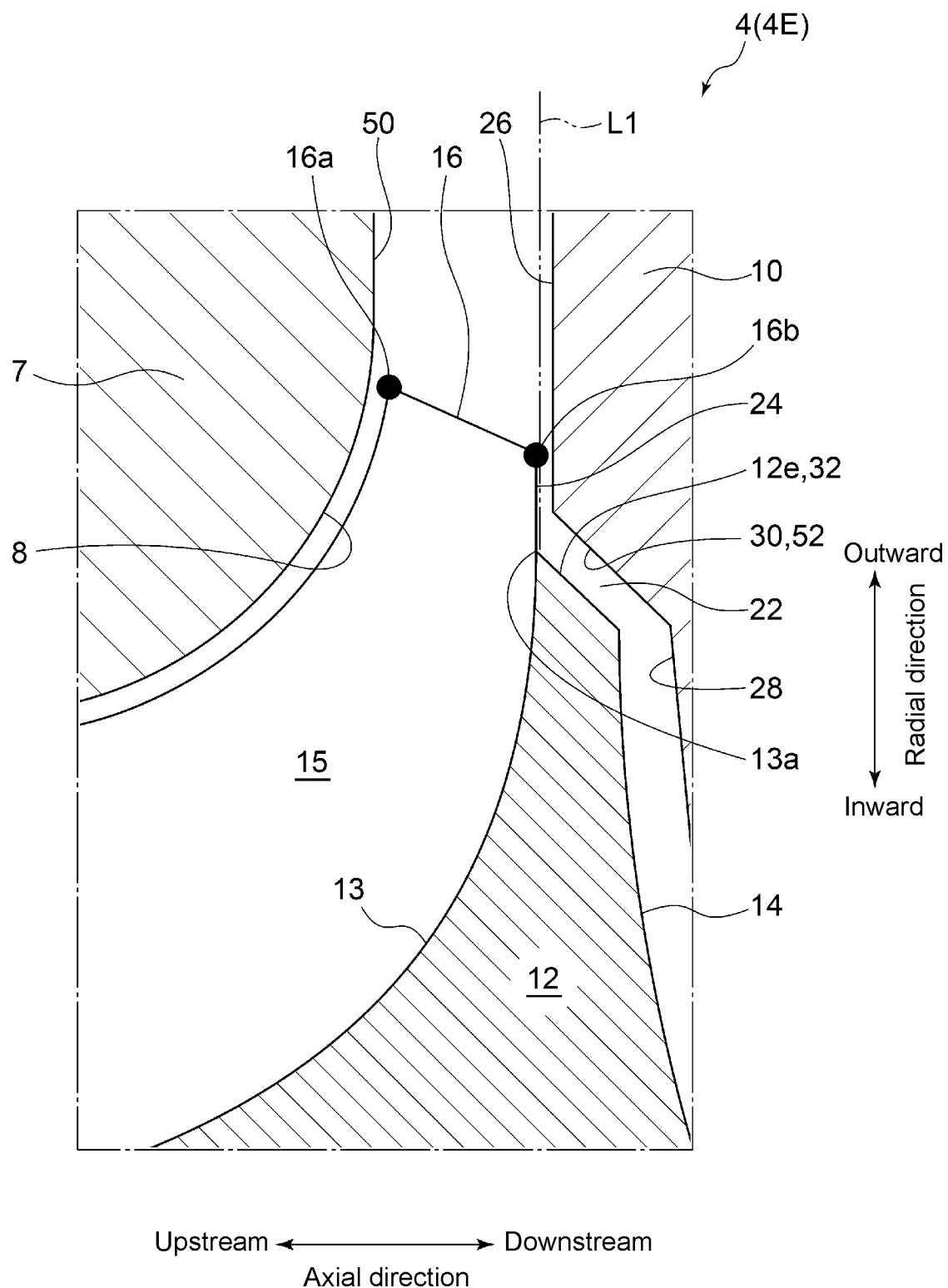
FIG. 6 is a schematic cross-sectional view of the centrifugal compressor 4 (4E) along the axial direction according to an embodiment, and shows an example of the detailed configuration of the centrifugal compressor 4 shown in FIG. 1.

FIG. 6 is a schematic cross-sectional view of the centrifugal compressor 4 (4E) along the axial direction according to an embodiment, and shows an example of the detailed configuration of the centrifugal compressor 4 shown in FIG. 1. In the configuration shown in FIG. 6, a reference sign common to each configuration shown in FIG. 3 denotes the same configuration as each configuration shown in FIG. 3 unless otherwise specified, and the description thereof is omitted.

The configuration shown in FIG. 6 differs from the configuration shown in FIG. 3 in that the outer peripheral portion 12e of the hub 12 has a chamfer 32 formed such that the hub surface 13 side is located radially outward of the back surface 14 side. The chamfer 32 is formed in a planar shape and is inclined radially inward from the hub surface 13 side toward the back surface 14 side. Further, in the configuration shown in FIG. 6, the step surface 30 of the housing 10 has a chamfer 52 formed parallel to the chamfer 32. The chamfer 52 extends radially inward from the hub-side wall surface 26 toward the back-side wall surface 28.

Figure 7:
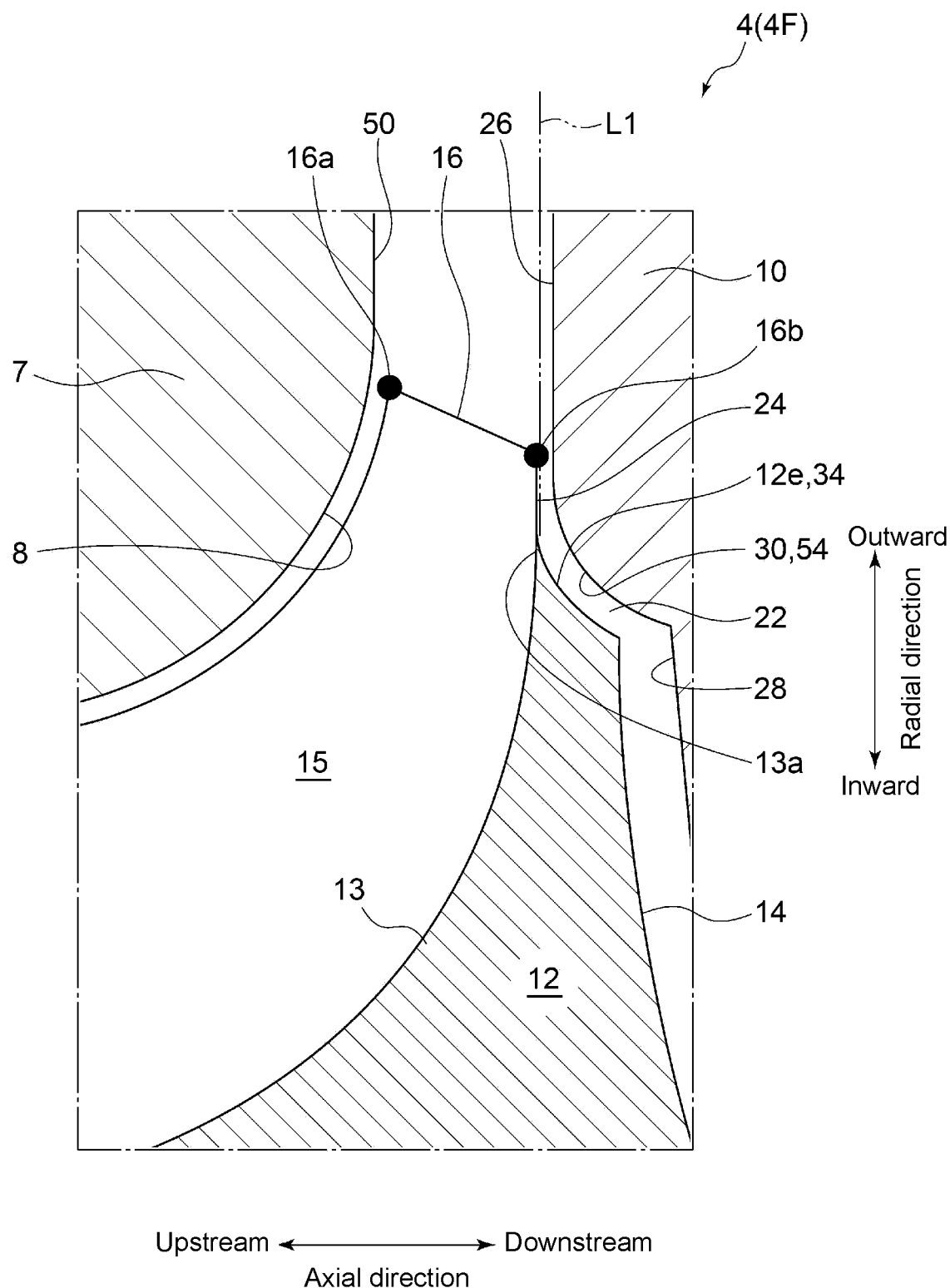
FIG. 7 is a schematic cross-sectional view of the centrifugal compressor 4 (4F) along the axial direction according to an embodiment, and shows an example of the detailed configuration of the centrifugal compressor 4 shown in FIG. 1.

FIG. 7 is a schematic cross-sectional view of the centrifugal compressor 4 (4F) along the axial direction according to an embodiment, and shows an example of the detailed configuration of the centrifugal compressor 4 shown in FIG. 1. In the configuration shown in FIG. 7, a reference sign common to each configuration shown in FIG. 3 denotes the same configuration as each configuration shown in FIG. 3 unless otherwise specified, and the description thereof is omitted.

The configuration shown in FIG. 7 differs from the configuration shown in FIG. 3 in that the outer peripheral portion 12e of the hub 12 has a concave round chamfer 34 formed such that the hub surface 13 side is located radially outward of the back surface 14 side. The round chamfer 34 is smoothly curved and is inclined radially inward from the hub surface 13 side toward the back surface 14 side. Further, in the configuration shown in FIG. 7, the step surface 30 of the housing 10 has a convex round chamfer 54 formed parallel to the round chamfer 34. The round chamfer 54 is smoothly curved and extends radially inward from the hub-side wall surface 26 toward the back-side wall surface 28.

In both of the centrifugal compressors 4 (4E) shown in FIG. 6 and the centrifugal compressors 4 (4F) shown in FIG. 7, the hub-side end 16b of the trailing edge 16 is located radially outward of the outer peripheral portion 12e of the hub 12 (the outer peripheral end of the hub 12), and the hub-side end 16b of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Further, in both of the centrifugal compressor 4 (4E) shown in FIG. 6 and the centrifugal compressor 4 (4F) shown in FIG. 7, the clearance 22 between the step surface 30 and the outer peripheral portion 12e of the hub 12 can be inclined in an opposite direction to a flow direction. As a result, entry of a main flow flowing through the air flow passage 18 into the clearance 22 is suppressed and the clearance loss can be reduced, making it possible to improve efficiency of the centrifugal compressor 4.

Figure 8:
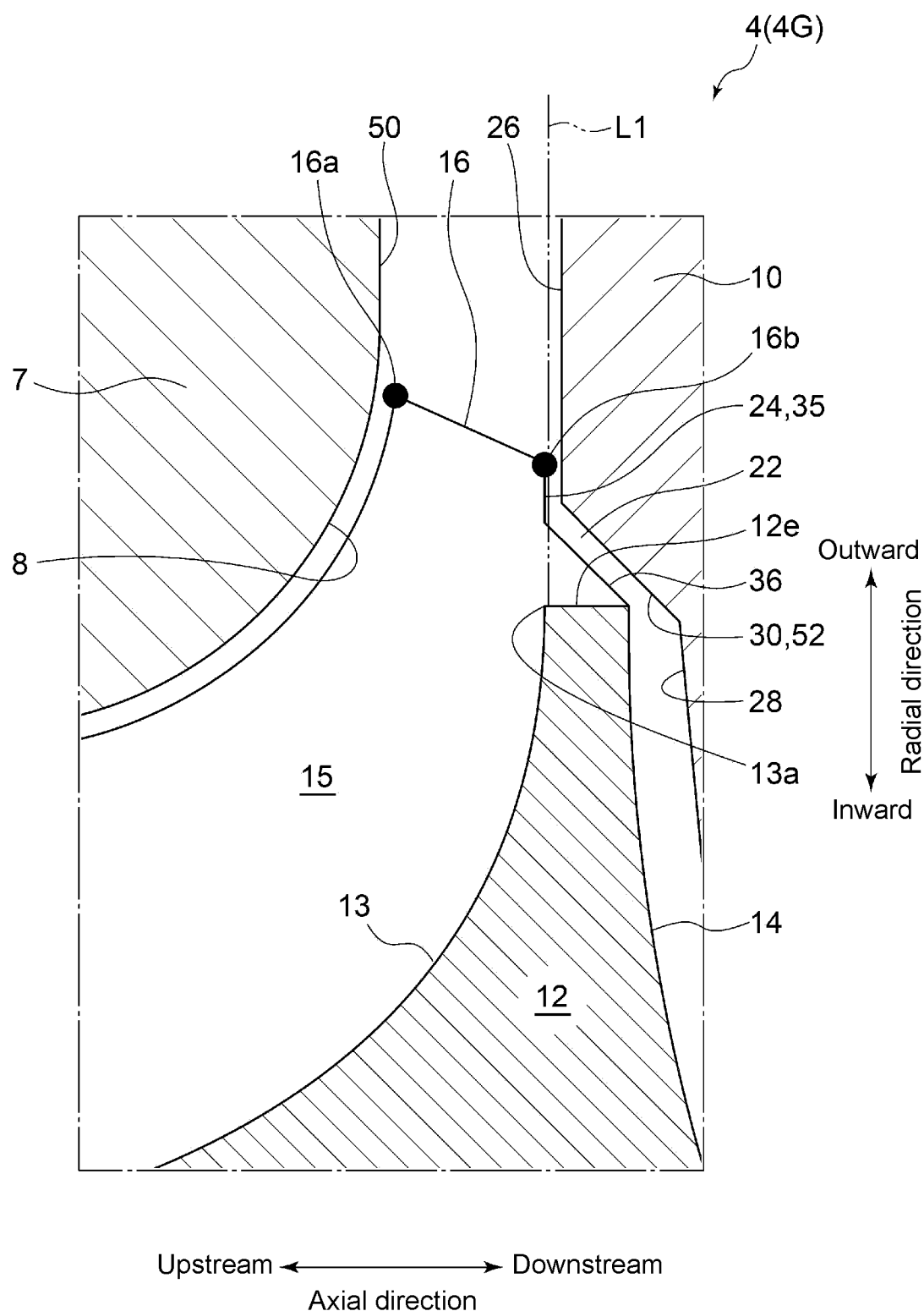
FIG. 8 is a schematic cross-sectional view of the centrifugal compressor 4 (4G) along the axial direction according to an embodiment, and shows an example of the detailed configuration of the centrifugal compressor 4 shown in FIG. 1.

FIG. 8 is a schematic cross-sectional view of the centrifugal compressor 4 (4G) along the axial direction according to an embodiment, and shows an example of the detailed configuration of the centrifugal compressor 4 shown in FIG. 1. In the configuration shown in FIG. 8, a reference sign common to each configuration shown in FIG. 3 denotes the same configuration as each configuration shown in FIG. 3 unless otherwise specified, and the description thereof is omitted.

The configuration shown in FIG. 8 differs from the configuration shown in FIG. 3 in that the blade root outer peripheral portion 24 connecting the hub-side end 16b of the trailing edge 16 and the outer peripheral portion 12e of the hub 12 has a chamfer edge 36. In the configuration shown in FIG. 8, the blade root outer peripheral portion 24 includes a portion 35 extending radially inward from the hub-side end 16b of the trailing edge 16, and the chamfer edge 36 connecting a radially inner end of the portion 35 and the outer peripheral portion 12e. The chamfer edge 36 is inclined radially inward as a distance from the above-described portion 35 increases in the axial direction, and is connected to a boundary between the outer peripheral portion 12e and the back surface 14.

Further, in the configuration shown in FIG. 8, the step surface 30 of the housing 10 has the chamfer 52 formed parallel to the chamfer edge 36, and the chamfer 52 extends radially inward from the hub-side wall surface 26 toward the back-side wall surface 28.

Figure 9:
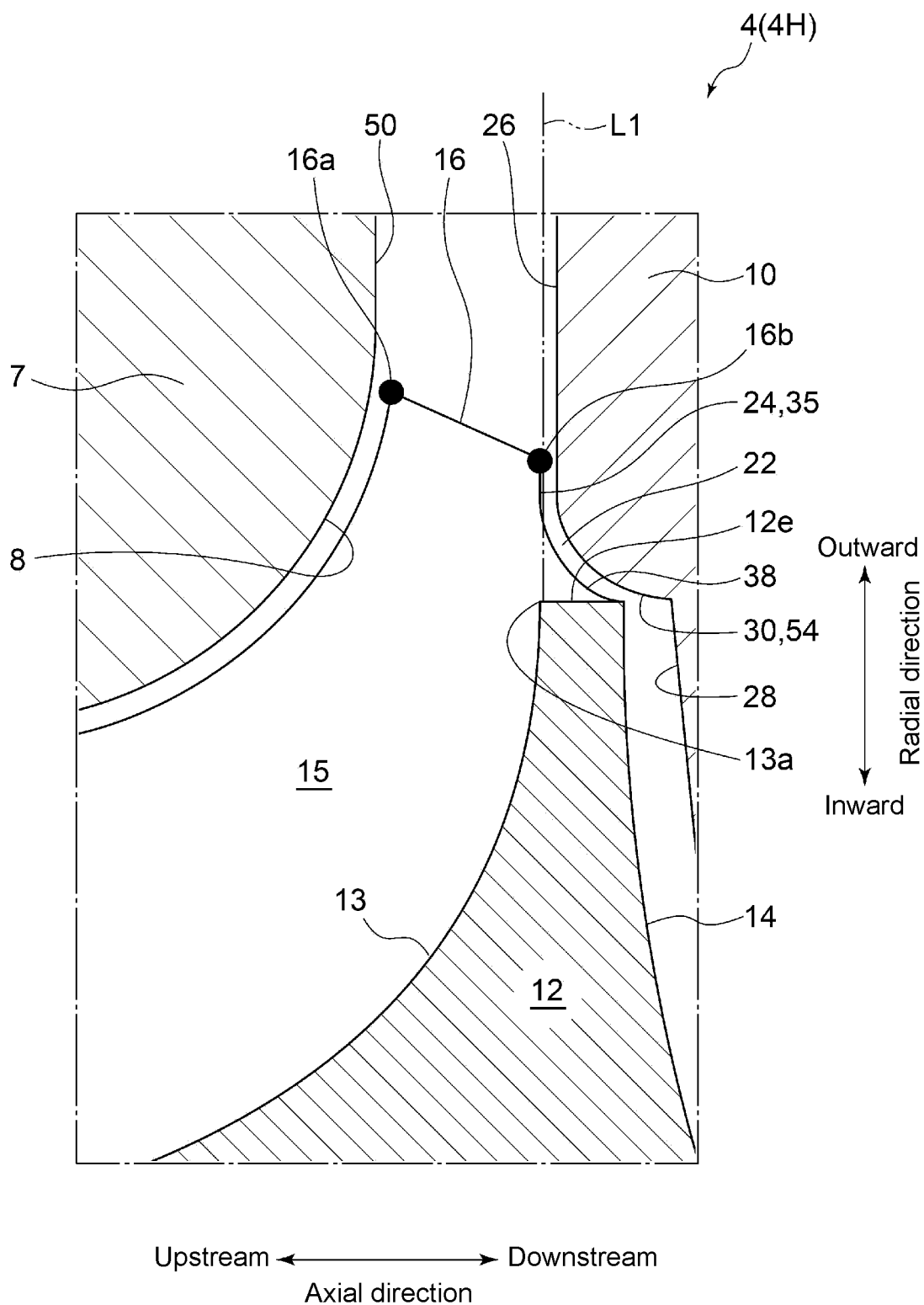
FIG. 9 is a schematic cross-sectional view of the centrifugal compressor 4 (4H) along the axial direction according to an embodiment, and shows an example of the detailed configuration of the centrifugal compressor 4 shown in FIG. 1.

FIG. 9 is a schematic cross-sectional view of the centrifugal compressor 4 (4H) along the axial direction according to an embodiment, and shows an example of the detailed configuration of the centrifugal compressor 4 shown in FIG. 1. In the configuration shown in FIG. 9, a reference sign common to each configuration shown in FIG. 3 denotes the same configuration as each configuration shown in FIG. 3 unless otherwise specified, and the description thereof is omitted.

The configuration shown in FIG. 9 differs from the configuration shown in FIG. 3 in that the blade root outer peripheral portion 24 connecting the hub-side end 16b of the trailing edge 16 and the outer peripheral portion 12e of the hub 12 has a concave round chamfer edge 38. In the configuration shown in FIG. 9, the blade root outer peripheral portion 24 includes the portion 35 extending radially inward from the hub-side end 16b of the trailing edge 16, and the concave round chamfer edge 38 connecting the radially inner end of the portion 35 and the outer peripheral portion 12e. The round chamfer edge 38 is smoothly curved radially inward as the distance from the above-described portion 35 increases in the axial direction, and is connected to the boundary between the outer peripheral portion 12e and the back surface 14.

Further, in the configuration shown in FIG. 9, the step surface 30 of the housing 10 has the convex round chamfer 54 formed parallel to the round chamfer edge 38. The round chamfer 54 is smoothly curved and extends radially inward from the hub-side wall surface 26 toward the back-side wall surface 28.

In both of the centrifugal compressors 4 (4G) shown in FIG. 8 and the centrifugal compressors 4 (4H) shown in FIG. 9, the hub-side end 16b of the trailing edge 16 is located radially outward of the outer peripheral portion 12e of the hub 12 (the outer peripheral end of the hub 12), and the hub-side end 16b of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Further, in both of the centrifugal compressor 4 (4G) shown in FIG. 8 and the centrifugal compressor 4 (4H) shown in FIG. 9, the clearance 22 between the step surface 30 and the chamfer edge 36 or the round chamfer edge 38 of the blade root outer peripheral portion 24 can be inclined in the opposite direction to the flow direction. As a result, entry of the main flow flowing through the air flow passage 18 into the clearance 22 is suppressed and the clearance loss can be reduced, making it possible to improve efficiency of the centrifugal compressor 4. Further, a stress concentration can be alleviated without forming a corner in the blade root outer peripheral portion 24, making it possible to improve the strength of the blade 15 against the centrifugal stress.

Figure 10:
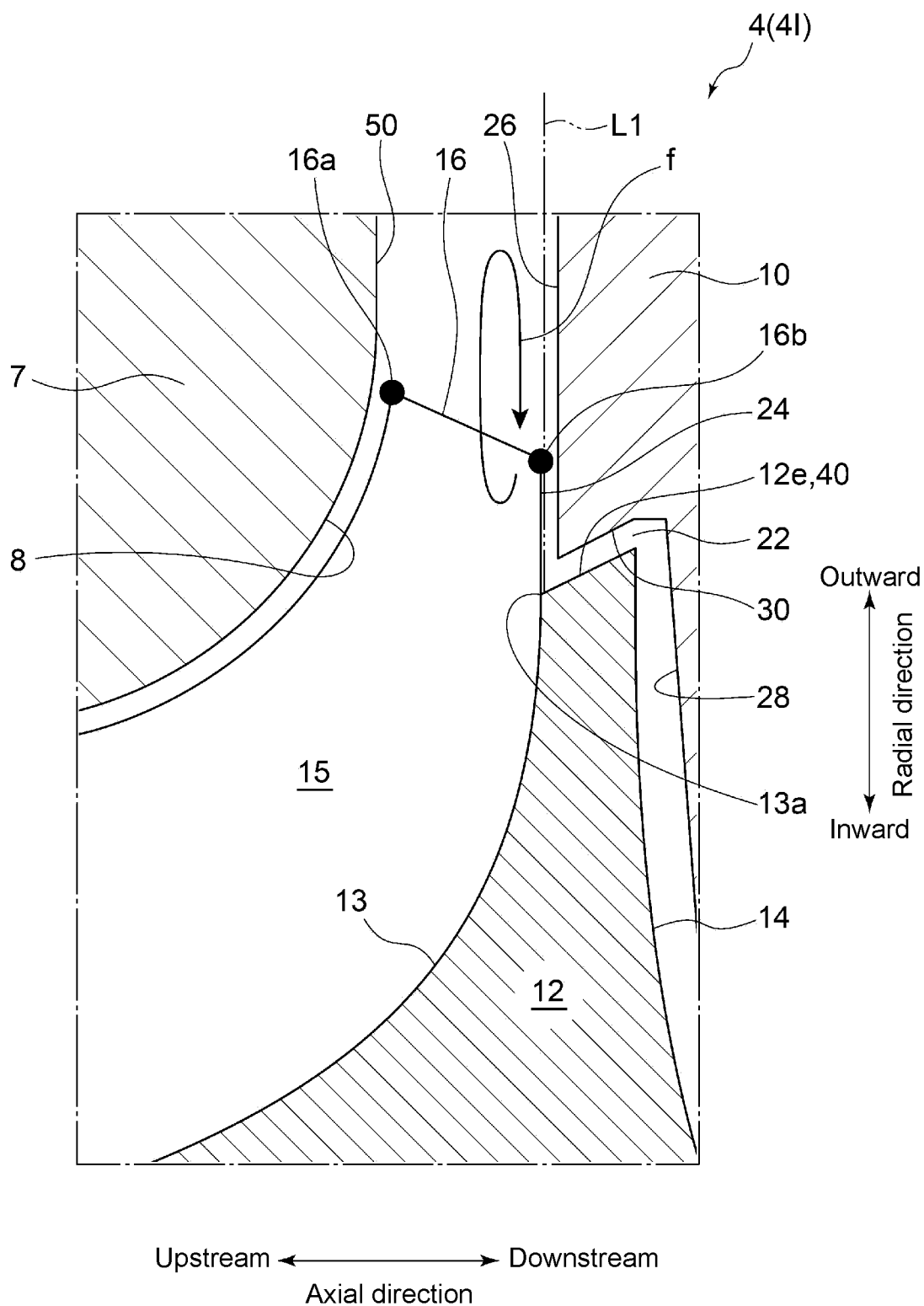
FIG. 10 is a schematic cross-sectional view of the centrifugal compressor 4 (4I) along the axial direction according to an embodiment, and shows an example of the detailed configuration of the centrifugal compressor 4 shown in FIG. 1.

FIG. 10 is a schematic cross-sectional view of the centrifugal compressor 4 (4I) along the axial direction according to an embodiment, and shows an example of the detailed configuration of the centrifugal compressor 4 shown in FIG. 1. In the configuration shown in FIG. 10, a reference sign common to each configuration shown in FIG. 3 denotes the same configuration as each configuration shown in FIG. 3 unless otherwise specified, and the description thereof is omitted.

The configuration shown in FIG. 10 differs from the configuration shown in FIG. 3 in that the outer peripheral portion 12e of the hub 12 has a chamfer 40 formed such that the back surface 14 side is located radially outward of the hub surface 13 side. The chamfer 40 is formed in a planar shape and is inclined radially outward from the hub surface 13 side toward the back surface 14 side. Further, in the configuration shown in FIG. 10, the step surface 30 of the housing 10 is formed parallel to the chamfer 40. That is, the step surface 30 is also formed as a chamfer and extends radially outward from the hub-side wall surface 26 side toward the back-side wall surface 28 side. In the centrifugal compressor 4 (4I), instead of or together with the chamfer 40, the outer peripheral portion 12e may have a concave round chamfer which is inclined radially outward from the hub surface 13 side toward the back surface 14 side.

Also in the impeller 6 of the centrifugal compressors 4 (4I) shown in FIG. 10, the hub-side end 16b of the trailing edge 16 is located radially outward of the outer peripheral portion 12e of the hub 12, and the hub-side end 16b of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Further, depending on the case of an internal flow of the centrifugal compressor 4, separation f may occur on the hub-side wall surface 26 side. In such a case, by adopting the inclined chamfer 40 and the step surface 30 to incline the shape of the clearance 22 as shown in FIG. 10, it is possible to reduce the clearance loss in the case where the above-described separation f occurs.

Figure 11:
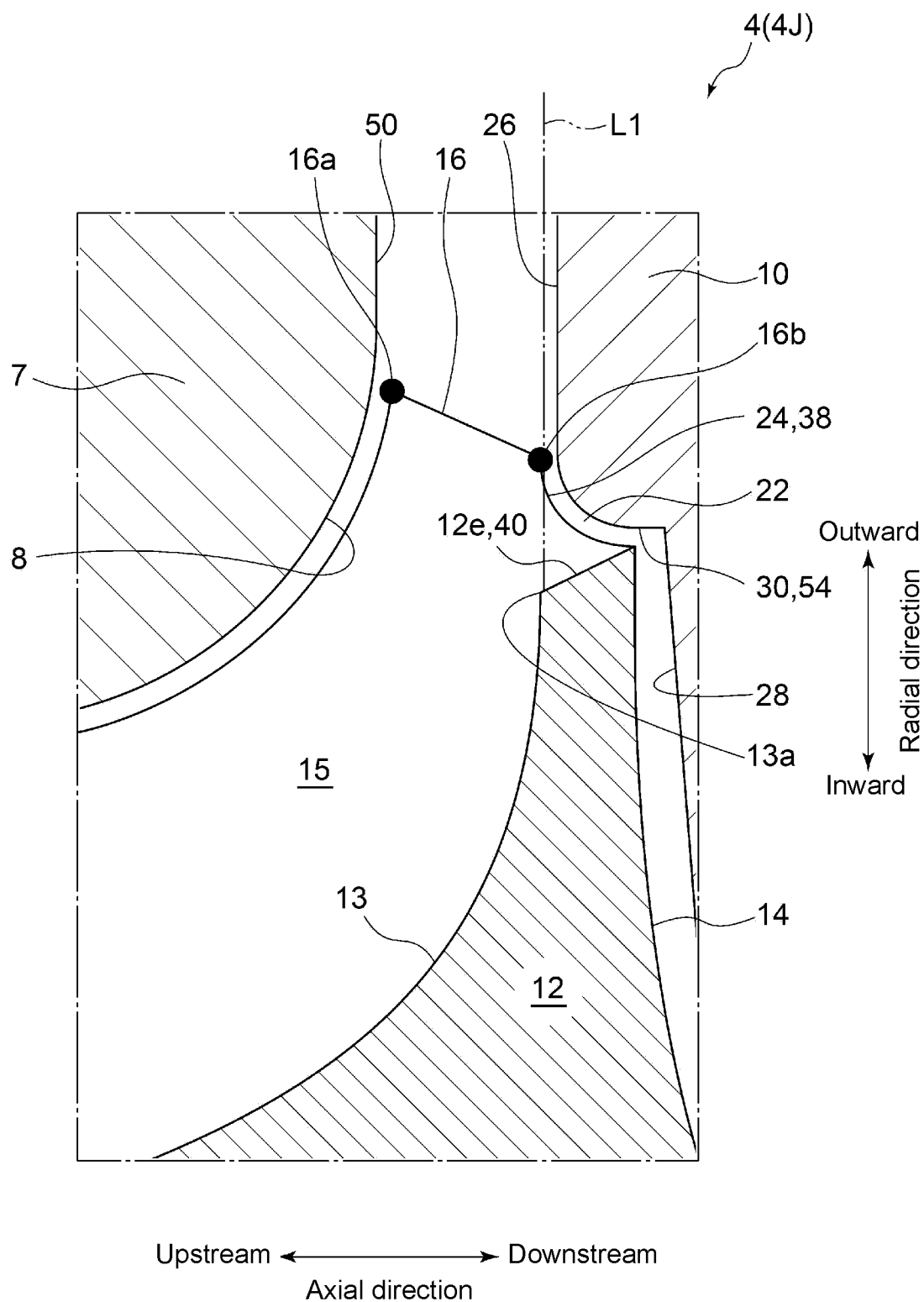
FIG. 11 is a schematic cross-sectional view of the centrifugal compressor 4 (4J) along the axial direction according to an embodiment, and shows an example of the detailed configuration of the centrifugal compressor 4 shown in FIG. 1.

FIG. 11 is a schematic cross-sectional view of the centrifugal compressor 4 (4J) along the axial direction according to an embodiment, and shows an example of the detailed configuration of the centrifugal compressor 4 shown in FIG. 1. In the configuration shown in FIG. 11, a reference sign common to each configuration shown in FIG. 10 denotes the same configuration as each configuration shown in FIG. 10 unless otherwise specified, and the description thereof is omitted.

The configuration shown in FIG. 11 differs from the configuration shown in FIG. in that the blade root outer peripheral portion 24 connecting the hub-side end 16b of the trailing edge 16 and the outer peripheral portion 12e of the hub 12 has the concave round chamfer edge 38. The round chamfer edge 38 is smoothly curved radially inward as a distance from the trailing edge 16 increases in the axial direction, and is connected to the boundary between the outer peripheral portion 12e and the back surface 14.

Further, in the configuration shown in FIG. 11, the step surface 30 of the housing has the convex round chamfer 54 formed parallel to the round chamfer edge 38. The round chamfer 54 is smoothly curved and extends radially inward from the hub-side wall surface 26 toward the back-side wall surface 28.

Also in the impeller 6 of the centrifugal compressors 4 (4J) shown in FIG. 11, the hub-side end 16b of the trailing edge 16 is located radially outward of the outer peripheral portion 12e of the hub 12, and the hub-side end 16b of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Further, since the blade root outer peripheral portion 24 has the concave round chamfer edge 38, the stress concentration can be alleviated without forming the corner in the blade root outer peripheral portion 24, making it possible to improve the strength of the blade against the centrifugal stress.

Further, since a part of the blade 15 is disposed inside the clearance 22, an action that the flow is discharged from the clearance 22 toward the outer peripheral side (that is, the air flow passage 18 side) is generated by the action of the centrifugal force associated with the rotation of the blade 15, which can contribute to the reduction in clearance loss and a reduction in thrust load.

In the centrifugal compressor 4 (4J), instead of or together with the chamfer 40, the outer peripheral portion 12e may have a concave round chamfer which is inclined radially outward from the hub surface 13 side toward the back surface 14 side. Further, instead of forming the step surface 30 by the convexly curved round chamfer, the step surface 30 may be formed by the chamfer.

Figure 12:
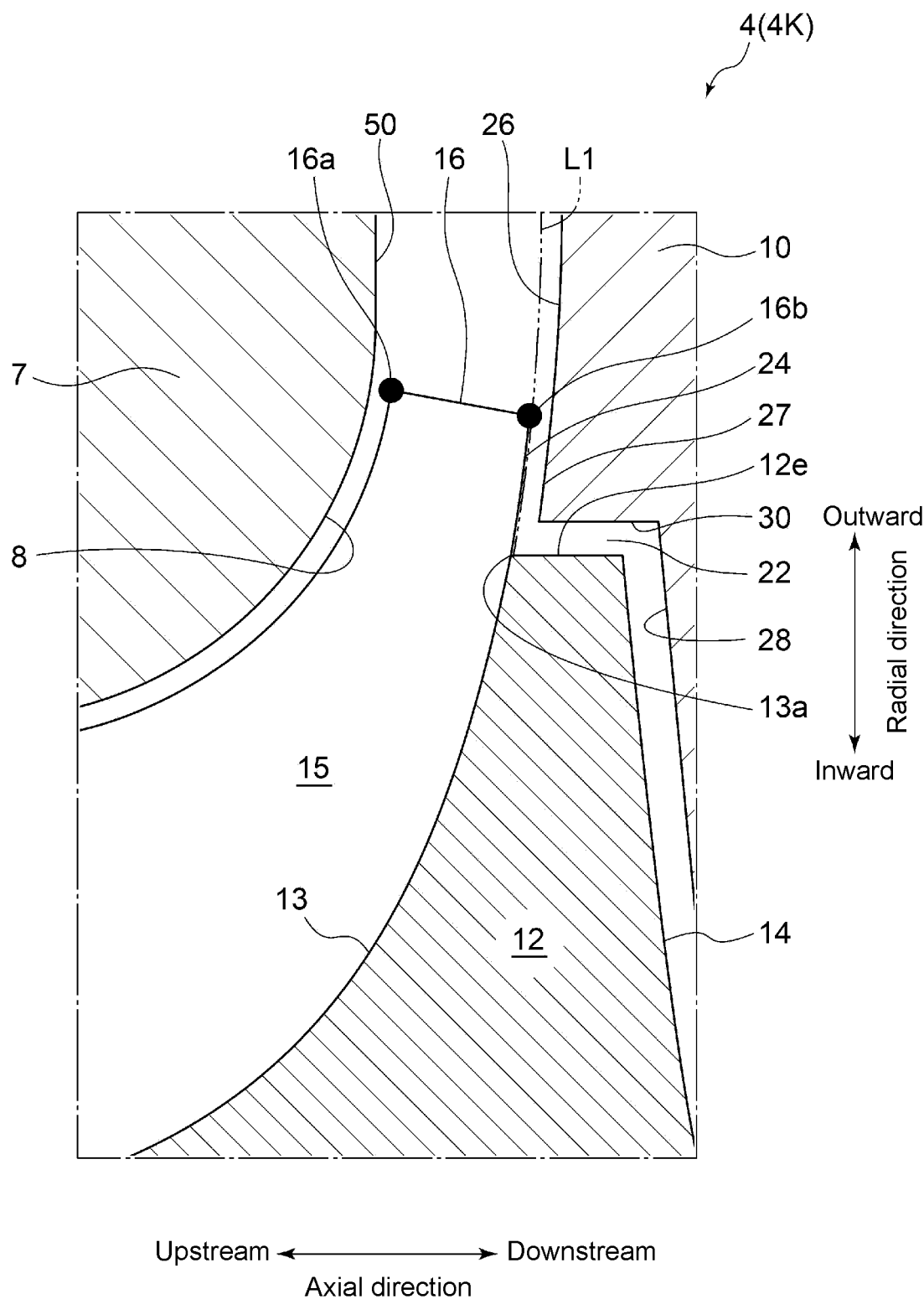
FIG. 12 is a schematic cross-sectional view of the centrifugal compressor 4 (4K) along the axial direction according to an embodiment, and shows an example of the detailed configuration of the centrifugal compressor 4 shown in FIG. 1.

FIG. 12 is a schematic cross-sectional view of the centrifugal compressor 4 (4K) along the axial direction according to an embodiment, and shows an example of the detailed configuration of the centrifugal compressor 4 shown in FIG. 1. In the configuration shown in FIG. 12, a reference sign common to each configuration shown in FIG. 2 denotes the same configuration as each configuration shown in FIG. 2 unless otherwise specified, and the description thereof is omitted.

As shown in FIG. 12, assuming that the line extending radially outward from the hub surface 13 of the hub 12 is the first line L1, the hub-side end 16b of the trailing edge 16 is located on the first line L1. In the form shown in FIG. 12, the first line L1 is a curved line which extends radially outward from the outer peripheral end 13a of the hub surface 13 and continues to the hub surface 13.

The blade 15 includes the blade root outer peripheral portion 24 connecting the hub-side end 16b of the trailing edge 16 and the outer peripheral portion 12e of the hub 12. In the illustrated exemplary form, the blade root outer peripheral portion 24 extends in a curved line along the first line L1 so as to connect the hub-side end 16b of the trailing edge 16 and the outer peripheral end 13a of the hub surface 13. Further, the trailing edge 16 is inclined with respect to the axial direction and linearly extends such that the shroud-side end 16a is located radially outward of the hub-side end 16b.

The blade root outer peripheral portion 24 is formed along the hub-side wall surface 26 and extends parallel to the hub-side wall surface 26. The hub-side wall surface 26 includes a curved portion 27 curved along the blade root outer peripheral portion 24. The blade root outer peripheral portion 24 is formed along the curved portion 27 and is formed parallel to the curved portion 27.

Also in the impeller 6 of the centrifugal compressors 4 (4K) shown in FIG. 12, the hub-side end 16b of the trailing edge 16 is located radially outward of the outer peripheral portion 12e of the hub 12, and the hub-side end 16b of the trailing edge 16 is located on the first line L1 extending radially outward from the hub surface 13. Thus, for the same reasons as in the configuration shown in FIG. 2, it is possible to suppress the decrease in pressure ratio of the centrifugal compressor 4 with low weight, and further it is possible to improve efficiency of the centrifugal compressor 4 by suppressing the clearance flow.

Figure 13:
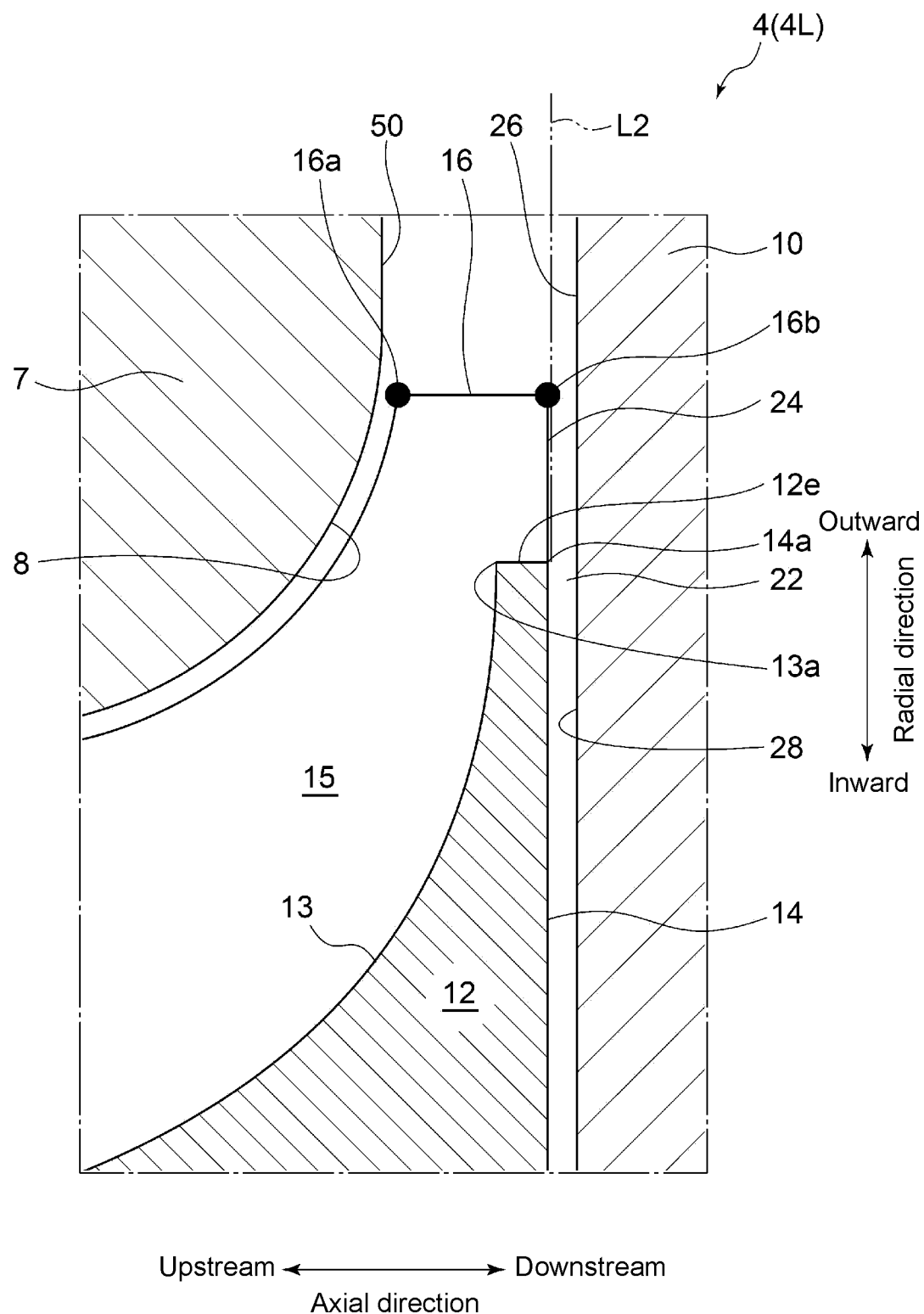
FIG. 13 is a schematic cross-sectional view of the centrifugal compressor 4 (4L) along the axial direction according to an embodiment, and shows an example of the detailed configuration of the centrifugal compressor 4 shown in FIG. 1.

FIG. 13 is a schematic cross-sectional view of the centrifugal compressor 4 (4L) along the axial direction according to an embodiment, and shows an example of the detailed configuration of the centrifugal compressor 4 shown in FIG. 1. In the configuration shown in FIG. 13, a reference sign common to each configuration shown in FIG. 2 denotes the same configuration as each configuration shown in FIG. 2 unless otherwise specified, and the description thereof is omitted.

In the configuration shown in FIG. 13, assuming that a line extending radially outward from the back surface 14 of the hub 12 is a second line L2, the hub-side end 16b of the trailing edge 16 is located on the second line L2. In the form shown in FIG. 13, the second line L2 is a straight imaginary line which extends radially outward from the outer peripheral end 14a of the back surface 14 and is along a tangential direction (radial direction) of the back surface 14.

The blade 15 includes the blade root outer peripheral portion 24 connecting the hub-side end 16b of the trailing edge 16 and the outer peripheral portion 12e of the hub 12. In the illustrated exemplary form, the blade root outer peripheral portion 24 extends along the second line L2 so as to connect the hub-side end 16b of the trailing edge 16 and the outer peripheral end 14a of the back surface 14.

In the configuration shown in FIG. 13, the housing 10 does not include the step surface 30 shown in FIG. 2 etc., but includes the hub-side wall surface 26 opposite to the blade root outer peripheral portion 24 and the back-side wall surface 28 opposite to the back surface 14 of the impeller 6 and connected to the hub-side wall surface 26. The blade root outer peripheral portion 24 is formed along the hub-side wall surface 26 and extends parallel to the hub-side wall surface 26.

According to the configuration shown in FIG. 13, the hub-side end 16b of the trailing edge 16 is located radially outward of the outer peripheral portion 12e of the hub 12. Thus, compared with the configuration where the outer diameter of the impeller 6 is the same as that in the configuration shown in FIG. 13 and the radial position of the hub-side end 16b of the trailing edge 16 coincides with the radial position of the outer peripheral end 13a of the hub surface 13, it is possible to reduce the weight of the impeller 6 while suppressing the decrease in pressure ratio of the centrifugal compressor 4. Further, compared with the configuration where the outer diameter of the impeller 6 is the same as that of the hub 12 shown in FIG. 13 and the radial position of the hub-side end 16b of the trailing edge 16 coincides with the radial position of the outer peripheral end 13a of the hub surface 13, it is possible to suppress the increase in weight of the impeller while increasing the pressure ratio of the centrifugal compressor 4. Thus, it is possible to suppress the decrease in pressure ratio with the low-weight impeller. Further, since the diameter of the clearance 22 is also reduced by reducing the outer diameter of the hub 12, it is possible to suppress the clearance flow and reduce the clearance loss.

Furthermore, the hub-side end 16b of the trailing edge 16 is located on the second line L2 extending radially outward from the back surface 14. Thus, the centrifugal force acts on the air in the vicinity of the inlet of the clearance 22 (the gap between the housing 10 and the outer peripheral portion 12e of the hub 12) in accordance with the rotation of the impeller 6, making it possible to further enhance the effect of suppressing inflow of the clearance flow into the clearance 22. Further, the clearance 22 between the hub 12 and the housing 10 extends from the position of the outer peripheral portion 12e of the hub 12 in the opposite direction to the main flow exiting the air flow passage 18, suppressing that the main flow exiting the air flow passage 18 enters the clearance 22 and making it possible to further reduce the clearance loss.

Thus, according to the impeller 6 of the centrifugal compressor 4 (4L), it is possible to suppress the decrease in pressure ratio of the centrifugal compressor 4 with low weight, and further it is possible to improve efficiency of the centrifugal compressor 4 by suppressing the clearance flow.

Figure 14:
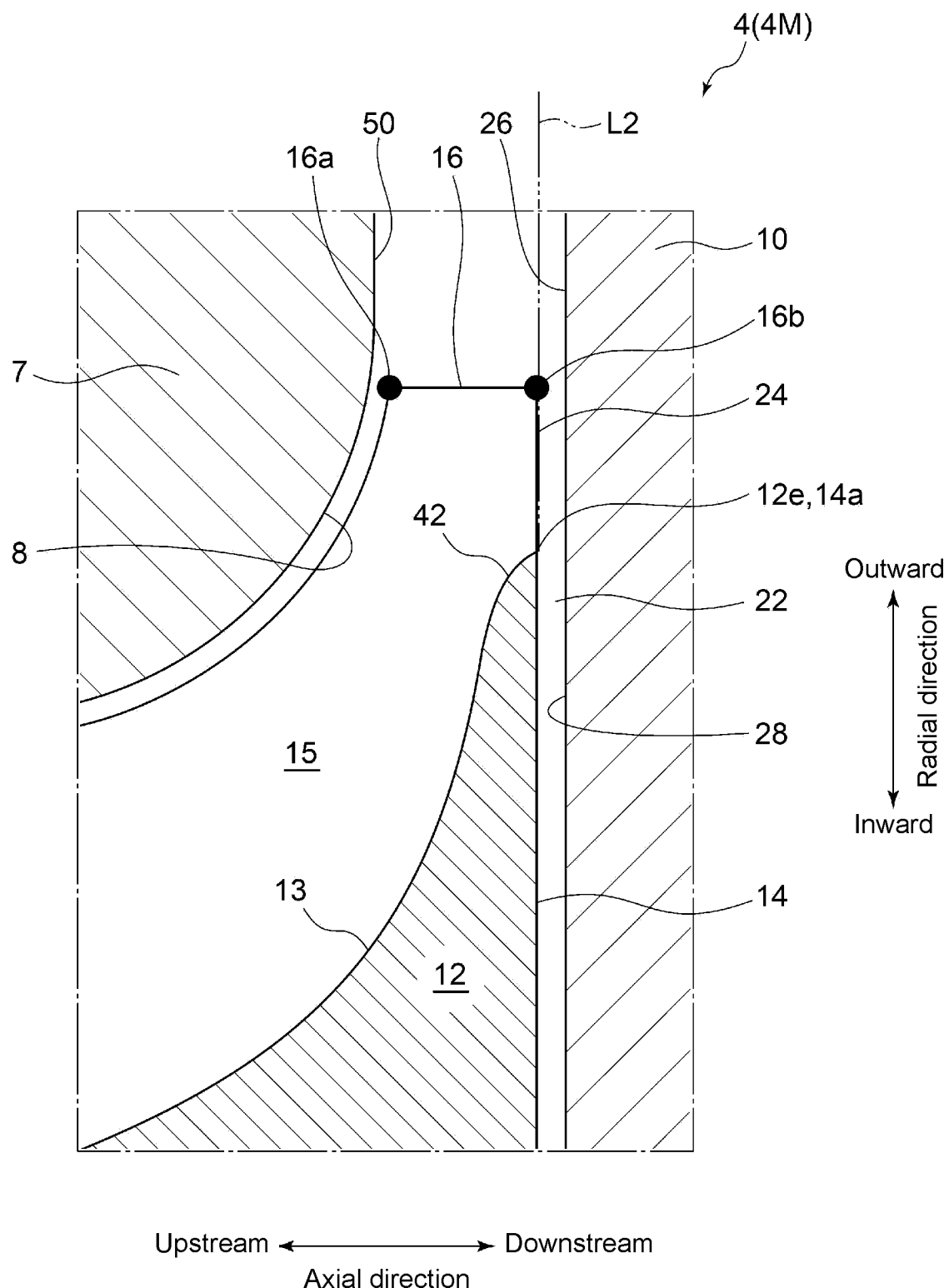
FIG. 14 is a schematic cross-sectional view of the centrifugal compressor 4 (4M) along the axial direction according to an embodiment, and shows an example of the detailed configuration of the centrifugal compressor 4 shown in FIG. 1.

FIG. 14 is a schematic cross-sectional view of the centrifugal compressor 4 (4M) along the axial direction according to an embodiment, and shows an example of the detailed configuration of the centrifugal compressor 4 shown in FIG. 1. In the configuration shown in FIG. 14, a reference sign common to each configuration shown in FIG. 13 denotes the same configuration as each configuration shown in FIG. 13 unless otherwise specified, and the description thereof is omitted.

The configuration shown in FIG. 14 differs from the configuration shown in FIG. 13 in that the hub 12 includes a concave round chamfer portion 42 smoothly curved so as to connect the hub surface 13 and the outer peripheral portion 12e.

Also in the impeller 6 of the centrifugal compressor 4 (4M) shown in FIG. 14, the hub-side end 16b of the trailing edge 16 is located radially outward of the outer peripheral portion 12e of the hub 12 (the outer peripheral end of the hub 12), and the hub-side end 16b of the trailing edge 16 is located on the second line L2 extending radially outward from the back surface 14. Thus, for the same reasons as in the configuration shown in FIG. 13, it is possible to suppress the decrease in pressure ratio of the centrifugal compressor 4 with low weight, and further it is possible to improve efficiency of the centrifugal compressor 4 by suppressing the clearance flow.

Further, since the hub 12 includes the convex round chamfer portion 42 connecting the hub surface 13 and the outer peripheral portion 12e, it is possible to suppress a rapid expansion of a flow-passage area at the position of the outer peripheral portion 12e of the hub 12, and it is possible to enhance the efficiency improvement effect.

Figure 15:
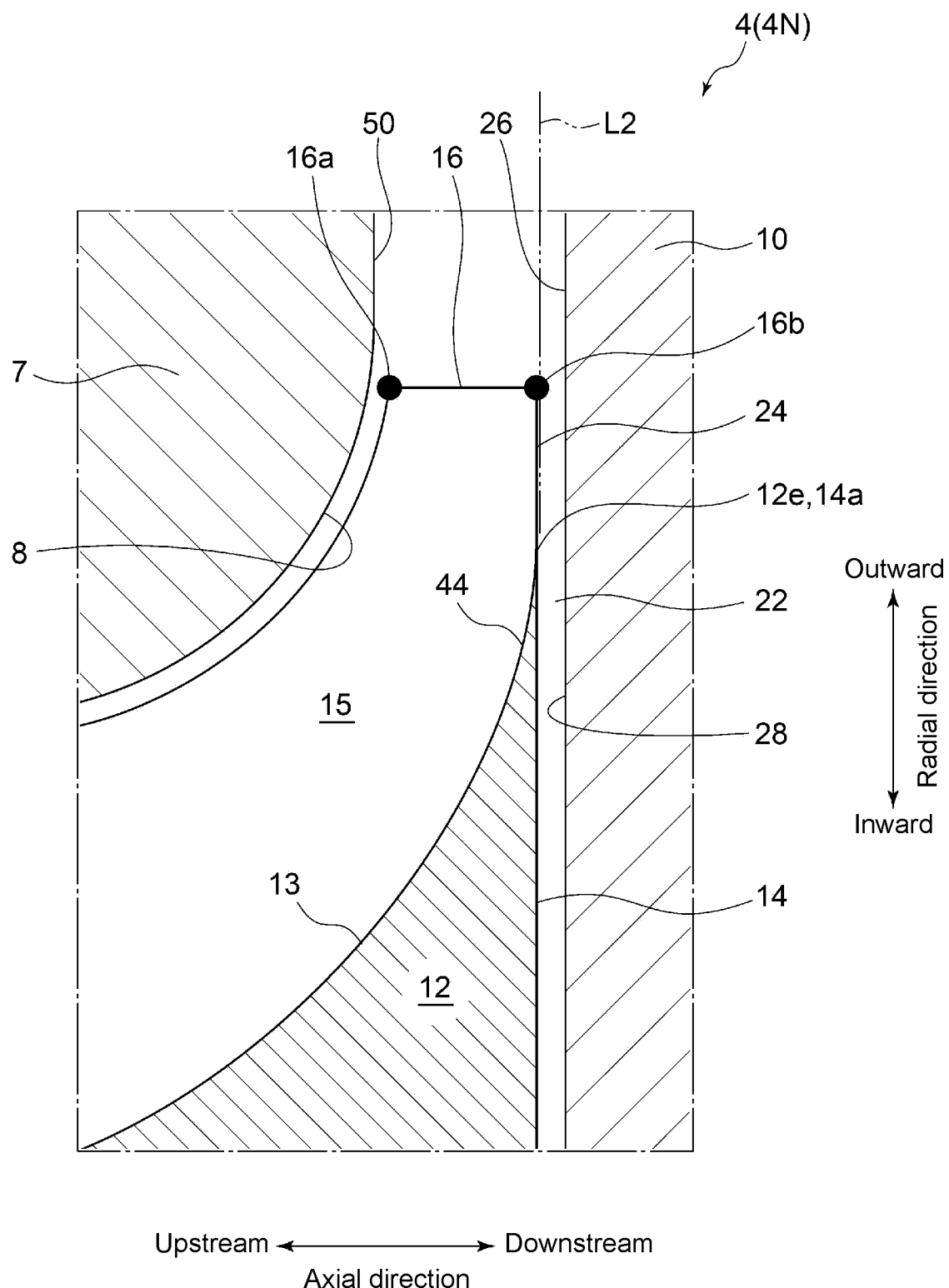
FIG. 15 is a schematic cross-sectional view of the centrifugal compressor 4 (4N) along the axial direction according to an embodiment, and shows an example of the detailed configuration of the centrifugal compressor 4 shown in FIG. 1.

FIG. 15 is a schematic cross-sectional view of the centrifugal compressor 4 (4N) along the axial direction according to an embodiment, and shows an example of the detailed configuration of the centrifugal compressor 4 shown in FIG. 1. In the configuration shown in FIG. 15, a reference sign common to each configuration shown in FIG. 13 denotes the same configuration as each configuration shown in FIG. 13 unless otherwise specified, and the description thereof is omitted.

The configuration shown in FIG. 15 differs from the configuration shown in FIG. 13 in that the hub 12 includes an inscribed surface portion 44 which continues to the hub surface 13 and is inscribed in the second line L2. In the configuration shown in FIG. 15, the inscribed surface portion 44 is inscribed in the blade root outer peripheral portion 24.

Also in the impeller 6 of the centrifugal compressor 4 (4N) shown in FIG. 15, the hub-side end 16b of the trailing edge 16 is located radially outward of the outer peripheral portion 12e of the hub 12 (the outer peripheral end of the hub 12), and the hub-side end 16b of the trailing edge 16 is located on the second line L2 extending radially outward from the back surface 14. Thus, for the same reasons as in the configuration shown in FIG. 13, it is possible to suppress the decrease in pressure ratio of the centrifugal compressor 4 with low weight, and further it is possible to improve efficiency of the centrifugal compressor 4 by suppressing the clearance flow.

Further, since the hub 12 includes the inscribed surface portion 44 which continues to the hub surface 13 and is inscribed in the second line L2, it is possible to suppress the rapid expansion of the flow-passage area at the position of the outer peripheral portion 12e of the hub 12, and it is possible to enhance the efficiency improvement effect.

Further, it is possible to reduce an angle formed by the main flow flowing through the air flow passage 18 and the hub-side wall surface 26 of the housing 10, thereby suppressing that the main flow enters the clearance 22 and making it possible to reduce the clearance loss. In the configuration shown in FIG. 15, the outer peripheral portion 12e of the hub 12 may include a minute round chamfer.

Figure 16:
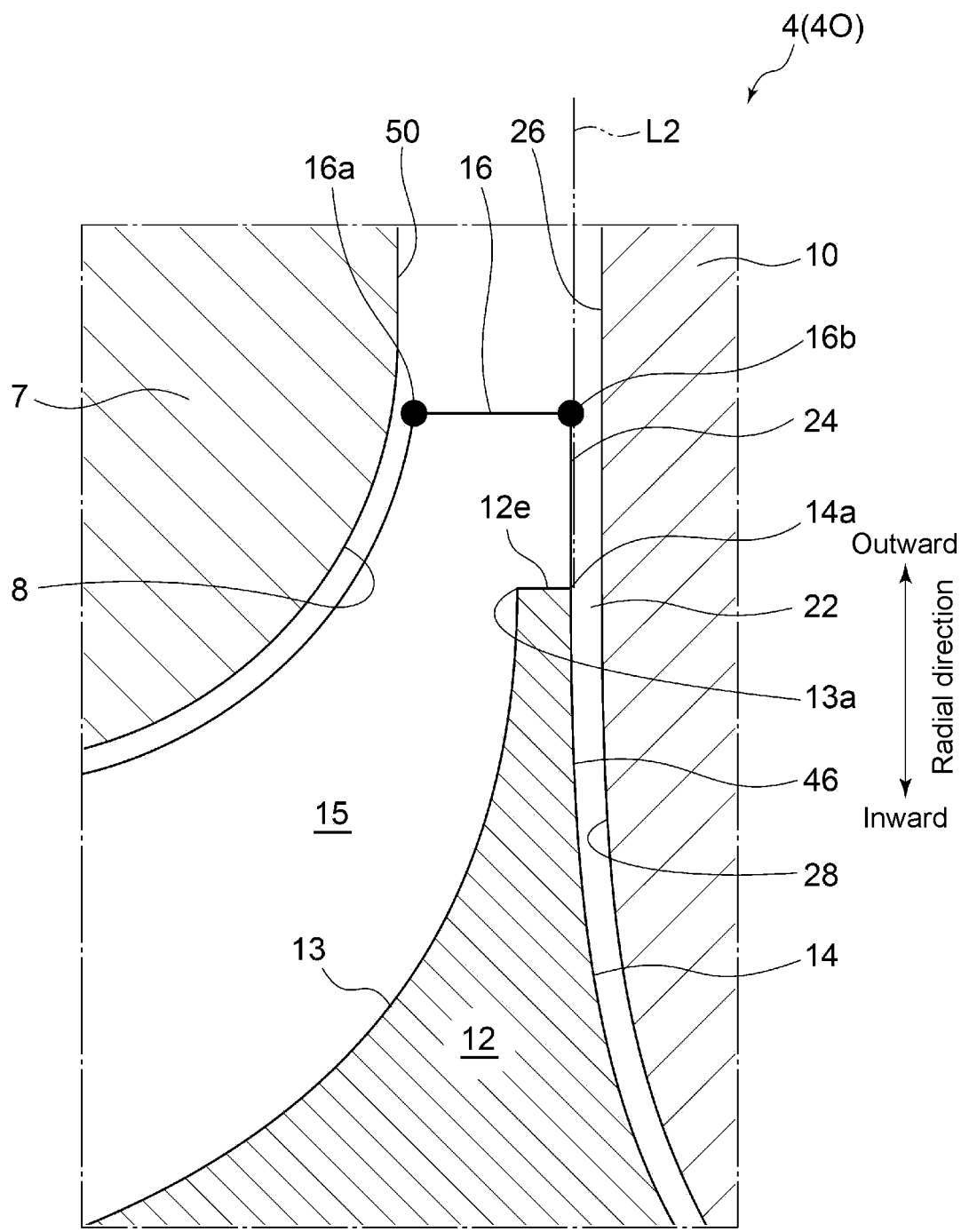
FIG. 16 is a schematic cross-sectional view of the centrifugal compressor 4 (4O) along the axial direction according to an embodiment, and shows an example of the detailed configuration of the centrifugal compressor 4 shown in FIG. 1.

FIG. 16 is a schematic cross-sectional view of the centrifugal compressor 4 (4O) along the axial direction according to an embodiment, and shows an example of the detailed configuration of the centrifugal compressor 4 shown in FIG. 1. In the configuration shown in FIG. 16, a reference sign common to each configuration shown in FIG. 13 denotes the same configuration as each configuration shown in FIG. 13 unless otherwise specified, and the description thereof is omitted.

The configuration shown in FIG. 16 differs from the configuration shown in FIG. 13 in that the back surface 14 of the impeller 6 includes a concavely formed curved surface 46. The curved surface 46 is smoothly curved and is inclined with respect to the radial direction so as to be directed radially inward as a distance from the outer peripheral portion 12e of the impeller 6 increases in the axial direction. Further, in the configuration shown in FIG. 16, the back-side wall surface 28 of the housing 10 is formed parallel to the curved surface 46. That is, the back-side wall surface 28 is smoothly curved as a convex curved surface, and extends radially inward as a distance from the hub-side wall surface 26 increases in the axial direction.

With such configuration, in addition to the effect of the configuration shown in FIG. 13, since the back surface 14 of the impeller 6 includes the curved surface 46, it is possible to increase the strength of the hub 12 against the centrifugal stress.

Figure 17:
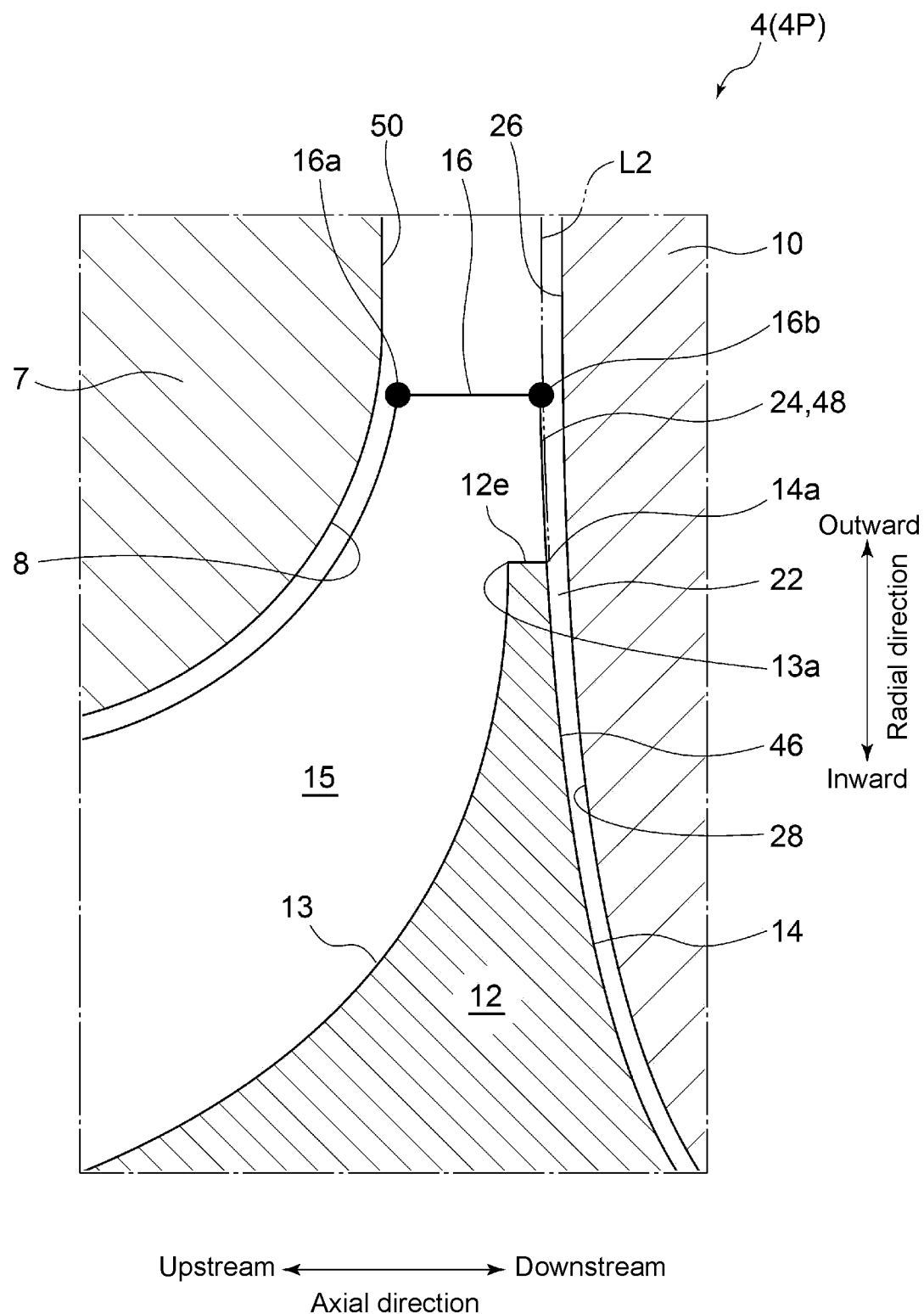
FIG. 17 is a schematic cross-sectional view of the centrifugal compressor 4 (4P) along the axial direction according to an embodiment, and shows an example of the detailed configuration of the centrifugal compressor 4 shown in FIG. 1.

FIG. 17 is a schematic cross-sectional view of the centrifugal compressor 4 (4P) along the axial direction according to an embodiment, and shows an example of the detailed configuration of the centrifugal compressor 4 shown in FIG. 1. In the configuration shown in FIG. 17, a reference sign common to each configuration shown in FIG. 16 denotes the same configuration as each configuration shown in FIG. 16 unless otherwise specified, and the description thereof is omitted.

The configuration shown in FIG. 17 differs from the configuration shown in FIG. 13 in that the blade root outer peripheral portion 24 has a curved surface edge 48 which continues to the curved surface 46. Further, the second line L2 is a curved imaginary line which extends radially outward from the outer peripheral end 14a of the back surface 14 and continues to the back surface 14, and the hub-side end 16b of the trailing edge 16 is located on the second line L2. Furthermore, a portion of the hub-side wall surface 26 opposite to the curved surface edge 48 is smoothly curved as a convex curved surface to be parallel to the curved surface edge 48.

With such configuration, in addition to the effect of the configuration shown in FIG. 13, since the back surface 14 of the impeller 6 includes the curved surface 46, it is possible to increase the strength of the hub 12 against the centrifugal stress.

Figure 18:
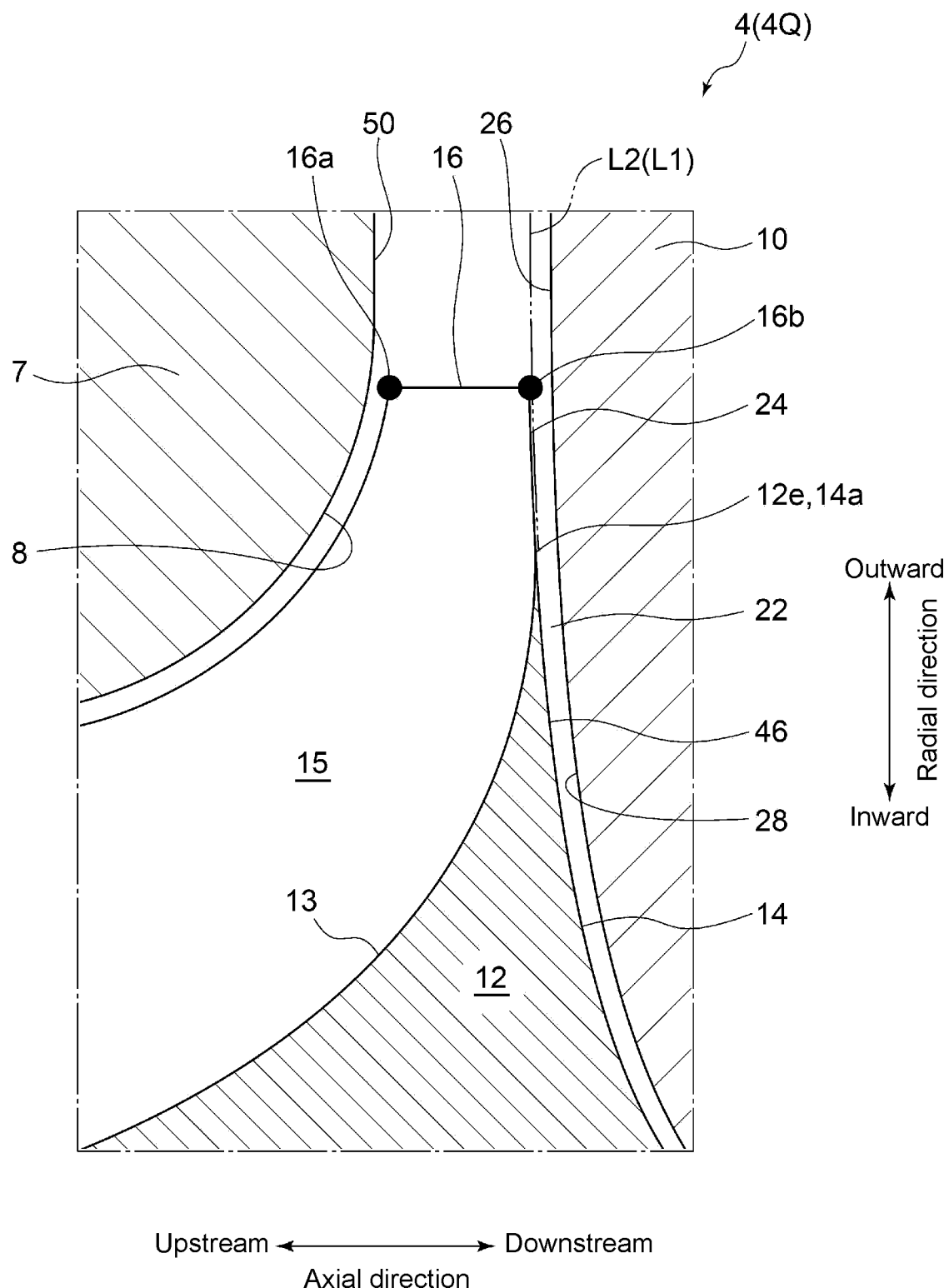
FIG. 18 is a schematic cross-sectional view of the centrifugal compressor 4 (4Q) along the axial direction according to an embodiment, and shows an example of the detailed configuration of the centrifugal compressor 4 shown in FIG. 1.

FIG. 18 is a schematic cross-sectional view of the centrifugal compressor 4 (4Q) along the axial direction according to an embodiment, and shows an example of the detailed configuration of the centrifugal compressor 4 shown in FIG. 1. In the configuration shown in FIG. 18, a reference sign common to each configuration shown in FIG. 16 denotes the same configuration as each configuration shown in FIG. 16 unless otherwise specified, and the description thereof is omitted.

In the configuration shown in FIG. 18, the second line L2 is the curved imaginary line which extends radially outward from the outer peripheral end 14a of the back surface 14 and continues to the back surface 14, and coincides with the first line L1 extending radially outward from the hub surface 13. Thus, the hub-side end 16b of the trailing edge 16 is located on the second line L2, and is located on the first line L1.

With such configuration, in addition to the effect of the configuration shown in FIG. 16, it is possible to suppress the rapid expansion of the flow-passage area at the position of the outer peripheral portion 12e of the hub 12, and it is possible to enhance the efficiency improvement effect.

Figure 19:
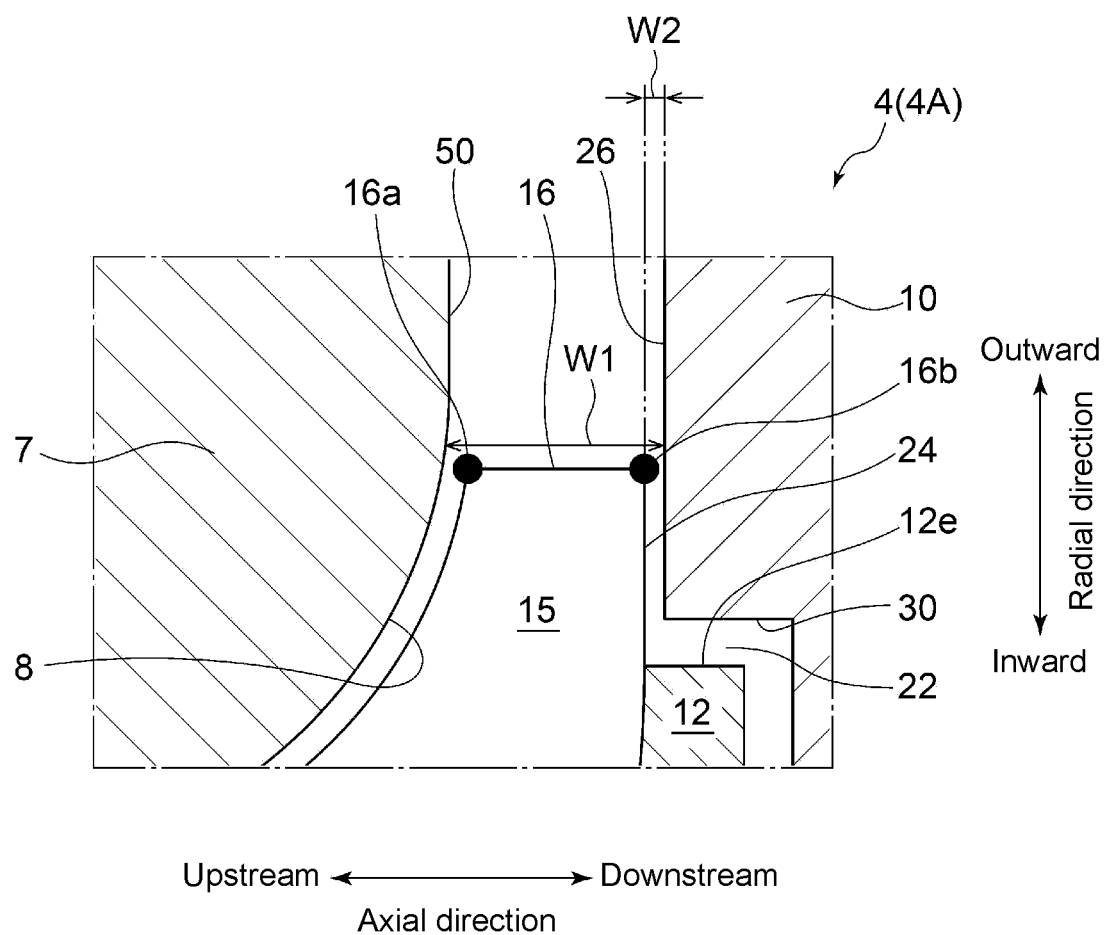
FIG. 19 is a partially enlarged view of the centrifugal compressor 4 (4A) shown in FIG. 2.

In some embodiments, for example, as shown in FIG. 19, the centrifugal compressor 4 is configured so as to satisfy $0.20 \geq W2/W1$, where W1 is a flow-passage width of the diffuser flow passage 19 at the position of the hub-side end 16b of the trailing edge 16 and W2 is a distance between the hub-side end 16b of the trailing edge 16 and the hub-side wall surface 26 along the axial direction. The centrifugal compressor 4 may preferably satisfy $0.16 \geq W2/W1$.

Thus, the centrifugal force effectively acts on the air in the vicinity of the inlet of the clearance 22 (the gap between the housing 10 and the outer peripheral portion 12e of the hub 12) in accordance with the rotation of the impeller 6, making it possible to further enhance the effect of suppressing inflow of the clearance flow into the clearance 22.

In the configuration shown in FIG. 19, the above-described centrifugal compressor 4 (4A) has been described as an example, and each of the above-described centrifugal compressors 4 (4B to 4Q) may satisfy 0.20≥W2/W1 (more preferably, 0.16≥W2/W1).

The present disclosure is not limited to the above-described embodiments, and also includes an embodiment obtained by modifying the above-described embodiments and an embodiment obtained by combining these embodiments as appropriate.

The contents described in the above embodiments would be understood as follows, for instance.

(1) An impeller (such as the above-described impeller 6) of a centrifugal compressor (such as the above-described centrifugal compressors 4 (4A to 4Q) according to at least one embodiment of the present disclosure is an impeller of a centrifugal compressor, including: a hub (such as the above-described hub 12); and at least one blade (such as the above-described blade 15) disposed on a hub surface (such as the above-described hub surface 13) of the hub. A hub-side end (such as the above-described hub-side end 16b) of a trailing edge (such as the above-described trailing edge 16) of the at least one blade is located radially outward of an outer peripheral portion (such as the above-described outer peripheral portion 12e) of the hub, and is located on either of a first line (such as the above-described first line L1) extending radially outward from the hub surface of the hub or a second line (such as the above-described second line L2) extending radially outward from a back surface (such as the above-described back surface 14) of the hub.

According to the impeller of the centrifugal compressor as defined in the above (1), the hub-side end of the trailing edge is located radially outward of the outer peripheral portion of the hub. Thus, compared with the configuration where a radial position of the outer peripheral end of the hub surface is enlarged to a radial position of the hub-side end of the trailing edge while maintaining the outer diameter of the impeller, it is possible to reduce the weight of the impeller while suppressing a decrease in pressure ratio of the centrifugal compressor. Further, compared with the configuration where the outer diameter of the impeller is reduced and the radial position of the hub-side end of the trailing edge is reduced to the radial position of the outer peripheral end of the hub surface, it is possible to suppress an increase in weight of the impeller while increasing the pressure ratio of the centrifugal compressor. Thus, it is possible to suppress the decrease in pressure ratio with the low-weight impeller. Further, since the diameter of the clearance formed on the back side of the hub is also reduced by reducing the outer diameter of the hub, it is possible to suppress leakage flow to the clearance (clearance flow) and reduce a loss caused by the clearance flow (clearance loss).

Further, the hub-side end of the trailing edge is located on either of the first line extending radially outward from the hub surface or the second line extending radially outward from the back surface of the hub. Thus, the centrifugal force acts on the air in the vicinity of the inlet of the above-described clearance in accordance with the rotation of the impeller, making it possible to further enhance the effect of suppressing inflow of the clearance flow.

Thus, according to the impeller of the centrifugal compressor as defined in the above (1), it is possible to suppress the decrease in pressure ratio of the centrifugal compressor with low weight, and further it is possible to improve efficiency of the centrifugal compressor by suppressing the clearance flow.

(2) In some embodiments, in the impeller of the centrifugal compressor as defined in the above (1), the hub-side end of the trailing edge is located on the first line.

According to the impeller of the centrifugal compressor as defined in the above (2), it is possible to suppress the decrease in pressure ratio of the centrifugal compressor with low weight, and further it is possible to improve efficiency of the centrifugal compressor by suppressing the clearance flow.

(3) In some embodiments, in the impeller of the centrifugal compressor as defined in the above (2), a shroud-side end (such as the above-described shroud-side end 16a) of the trailing edge is located radially outward of the hub-side end.

In a typical centrifugal compressor, the total pressure on the shroud side is more likely to decrease than on the hub side. Thus, with the configuration as defined in the above (3), a non-uniform total pressure distribution caused in the impeller is uniformed, making it possible to suppress the occurrence of separation in the diffuser flow passage. Further, as a result of reducing the mass of the portion of the blade in the vicinity of the outer peripheral portion of the hub, it is possible to reduce the centrifugal stress acting on the hub.

(4) In some embodiments, in the impeller of the centrifugal compressor as defined in the above (2), a shroud-side end of the trailing edge is located radially inward of the hub-side end.

Depending on a state of an internal flow of the centrifugal compressor, the total pressure may be lower on the hub side than on the shroud side. Thus, with the configuration as defined in the above (4), the non-uniform total pressure distribution caused in the impeller is uniformed, making it possible to suppress the occurrence of separation in the diffuser flow passage.

(5) In some embodiments, in the impeller of the centrifugal compressor as defined in the above (2), a central portion (such as the above-described central portion 16c) of the trailing edge is located radially outward of the shroud-side end and the hub-side end of the trailing edge.

Depending on the state of the internal flow of the centrifugal compressor, the total pressure may be lower in the central portion of the trailing edge than on the hub side and on the shroud side. Thus, with the configuration as defined in the above (5), the non-uniform total pressure distribution caused in the impeller is uniformed, making it possible to suppress the occurrence of separation in the diffuser flow passage.

(6) In some embodiments, in the impeller of the centrifugal compressor as defined in the above (2), the outer peripheral portion of the hub has a chamfer (such as the above-described chamfer 32) or a concave round chamfer (such as the above-described round chamfer 34) formed such that the hub surface is located radially outward of the back surface.

According to the impeller of the centrifugal compressor as defined in the above (6), the clearance formed along the outer peripheral portion of the hub can be inclined in an opposite direction to a flow direction of a main flow of the centrifugal compressor. As a result, entry of the main flow into the clearance is suppressed and the clearance loss can be reduced, making it possible to improve efficiency of the centrifugal compressor.

(7) In some embodiments, in the impeller of the centrifugal compressor as defined in the above (2), the at least one blade includes a blade root outer peripheral portion (such as the above-described blade root outer peripheral portion 24) connecting the hub-side end of the trailing edge and the outer peripheral portion of the hub, the blade root outer peripheral portion having a chamfer edge (such as the above-described chamfer edge 36) or a concave round chamfer edge (such as the above-described round chamfer edge 38).

According to the impeller of the centrifugal compressor as defined in the above (7), the clearance formed along the chamfer edge or the round chamfer edge of the blade root outer peripheral portion can be inclined in the opposite direction to the flow direction of the main flow of the centrifugal compressor. As a result, entry of the main flow into the clearance is suppressed and the clearance loss can be reduced, making it possible to improve efficiency of the centrifugal compressor. Further, a stress concentration can be alleviated without forming a corner in the blade root outer peripheral portion, making it possible to improve the strength of the blade against the centrifugal stress.

(8) In some embodiments, in the impeller of the centrifugal compressor as defined in the above (2), the outer peripheral portion of the hub has a chamfer (such as the above-described chamfer 40) or a concave round chamfer formed such that the back surface is located radially outward of the hub surface.

Depending on the case of the internal flow of the centrifugal compressor, separation may occur on the hub-side side of the diffuser flow passage. In such a case, by adopting the chamfer or the concave round chamfer as defined in the above (8) to incline the shape of the clearance along the outer peripheral surface of the hub, it is possible to reduce the clearance loss in the case where the above-described separation occurs.

(9) In some embodiments, in the impeller of the centrifugal compressor as defined in the above (8), the at least one blade includes a blade root outer peripheral portion (such as the above-described blade root outer peripheral portion 24) connecting the hub-side end of the trailing edge and the outer peripheral portion of the hub, the blade root outer peripheral portion having a chamfer edge (such as the above-described chamfer edge 36) or a concave round chamfer edge (such as the above-described round chamfer edge 38).

According to the impeller of the centrifugal compressor as defined in the above (9), since the blade root outer peripheral portion has the chamfer edge or the concave round chamfer edge, the stress concentration can be alleviated without forming the corner in the blade root outer peripheral portion, making it possible to improve the strength of the blade against the centrifugal stress.

Further, since a part of the blade is disposed inside the clearance along the art book portion of the hub, an action that the flow is discharged from the clearance toward the outer peripheral side is generated by the action of the centrifugal force associated with the rotation of the blade, which can contribute to the reduction in clearance loss and a reduction in thrust load.

(10) In some embodiments, in the impeller of the centrifugal compressor as defined in the above (1), the hub-side end of the trailing edge is located on the second line.

According to the impeller of the centrifugal compressor as defined in the above (10), it is possible to suppress the decrease in pressure ratio of the centrifugal compressor with low weight, and further it is possible to improve efficiency of the centrifugal compressor by suppressing the clearance flow.

(11) In some embodiments, in the impeller of the centrifugal compressor as defined in the above (10), the hub includes a convex round chamfer portion (such as the above-described round chamfer portion 42) connecting the hub surface and the outer peripheral portion.

According to the impeller of the centrifugal compressor as defined in the above (11), since the hub includes the convex round chamfer portion connecting the hub surface and the outer peripheral portion, it is possible to suppress a rapid expansion of a flow-passage area at the position of the outer peripheral portion of the hub, and it is possible to enhance the efficiency improvement effect.

(12) In some embodiments, in the impeller of the centrifugal compressor as defined in the above (10), the hub includes an inscribed surface portion (such as the above-described inscribed surface portion 44) which continues to the hub surface and is inscribed in the second line.

According to the impeller of the centrifugal compressor as defined in the above (12), since the hub includes the inscribed surface portion which continues to the hub surface and is inscribed in the second line, it is possible to suppress the rapid expansion of the flow-passage area at the position of the outer peripheral portion of the hub, and it is possible to enhance the efficiency improvement effect.

Further, it is possible to reduce an angle formed by the main flow of the centrifugal compressor and the hub-side wall surface of the diffuser flow passage, thereby suppressing that the main flow enters the clearance on the back side of the impeller and making it possible to reduce the clearance loss.

(13) In some embodiments, in the impeller of the centrifugal compressor as defined in the above (10), the back surface of the hub includes a concavely formed curved surface (such as the above-described curved surface 46).

According to the impeller of the centrifugal compressor as defined in the above (13), since the back surface of the impeller includes the curved surface, it is possible to increase the strength of the hub against the centrifugal stress.

(14) In some embodiments, in the impeller of the centrifugal compressor as defined in the above (13), the at least one blade includes a blade root outer peripheral portion (such as the above-described blade root outer peripheral portion 24) connecting the hub-side end of the trailing edge and the outer peripheral portion of the hub, the blade root outer peripheral portion having a curved surface edge (such as the above-described curved surface edge 48) continuing to the curved surface.

According to the impeller of the centrifugal compressor as defined in the above (14), since the back surface of the impeller includes the curved surface, it is possible to increase the strength of the hub against the centrifugal stress.

(15) In some embodiments, in the impeller of the centrifugal compressor as defined in the above (14), the hub includes an inscribed surface portion (such as the above-described inscribed surface portion 44) which continues to the hub surface and is inscribed in the second line.

According to the impeller of the centrifugal compressor as defined in the above (15), since the hub includes the inscribed surface portion which continues to the hub surface and is inscribed in the second line, it is possible to suppress the rapid expansion of the flow-passage area at the position of the outer peripheral portion of the hub, and it is possible to enhance the efficiency improvement effect.

(16) A centrifugal compressor according to at least one embodiment of the present disclosure is a centrifugal compressor, including: the impeller of the centrifugal compressor as defined in any one of the above (1) to (15); and a shroud-side wall surface and a hub-side wall surface defining a diffuser flow passage (such as the above-described diffuser flow passage 19) through which a fluid compressed by the impeller of the centrifugal compressor flows. 0.20≥W2/W1 is satisfied, where W1 is a flow-passage width of the diffuser flow passage at a position of the hub-side end of the trailing edge and W2 is a distance between the hub-side end of the trailing edge and the hub-side wall surface along an axial direction.

According to the centrifugal compressor as defined in the above (16), the centrifugal force effectively acts on the air in the vicinity of the inlet of the clearance formed along the back surface of the impeller in accordance with the rotation of the impeller, making it possible to further enhance the effect of suppressing inflow of the clearance flow into the clearance.

(17) A centrifugal compressor according to at least one embodiment of the present disclosure is a centrifugal compressor, including: the impeller of the centrifugal compressor as defined in the above (6); a shroud-side wall surface and a hub-side wall surface defining a diffuser flow passage (such as the above-described diffuser flow passage 19) through which a fluid compressed by the impeller of the centrifugal compressor flows; and a back-side wall surface opposite to the back surface of the hub. The centrifugal compressor further includes an opposite wall surface which connects the hub-side wall surface and the back-side wall surface and is opposite to the outer peripheral surface of the hub, the opposite wall surface having a chamfer or a convex round chamfer.

According to the centrifugal compressor as defined in the above (17), the clearance between the outer peripheral portion of the hub and the opposite wall surface can be inclined in the opposite direction to the flow direction. As a result, entry of the main flow of the centrifugal compressor into the clearance is suppressed and the clearance loss can be reduced, making it possible to improve efficiency of the centrifugal compressor.

(18) A centrifugal compressor according to at least one embodiment of the present disclosure is a centrifugal compressor, including: the impeller of the centrifugal compressor as defined in the above (7); a shroud-side wall surface and a hub-side wall surface defining a diffuser flow passage (such as the above-described diffuser flow passage 19) through which a fluid compressed by the impeller of the centrifugal compressor flows; and a back-side wall surface opposite to the back surface of the hub. The centrifugal compressor further includes an opposite wall surface which connects the hub-side wall surface and the back-side wall surface and is opposite to the blade root outer peripheral portion, the opposite wall surface having a chamfer or a convex round chamfer.

According to the impeller of the centrifugal compressor as defined in the above (18), the clearance between the blade root outer peripheral portion and the opposite wall surface can be inclined in the opposite direction to the flow direction. As a result, entry of the main flow of the centrifugal compressor into the clearance is suppressed and the clearance loss can be reduced, making it possible to improve efficiency of the centrifugal compressor.

(19) A centrifugal compressor according to at least one embodiment of the present disclosure is a centrifugal compressor, including: the impeller of the centrifugal compressor as defined in the above (8); a shroud-side wall surface and a hub-side wall surface defining a diffuser flow passage (such as the above-described diffuser flow passage 19) through which a fluid compressed by the impeller of the centrifugal compressor flows; and a back-side wall surface opposite to the back surface of the hub. The centrifugal compressor further includes an opposite wall surface which connects the hub-side wall surface and the back-side wall surface and is opposite to the outer peripheral portion of the hub, the opposite wall surface having a chamfer or a convex round chamfer.

According to the impeller of the centrifugal compressor as defined in the above (19), the clearance between the outer peripheral portion of the hub and the opposite wall surface can be inclined in the opposite direction to the flow direction. As a result, entry of the main flow of the centrifugal compressor into the clearance is suppressed and the clearance loss can be reduced, making it possible to improve efficiency of the centrifugal compressor.

(20) A centrifugal compressor according to at least one embodiment of the present disclosure includes: the impeller of the centrifugal compressor as defined in any one of the above (1) to (15); and a housing (such as the above-described housing 10) for accommodating a bearing for rotatably supporting the impeller. The at least one blade includes a blade root outer peripheral portion (such as the above-described blade root outer peripheral portion 24) connecting the hub-side end of the trailing edge and the outer peripheral portion of the hub. The blade root outer peripheral portion extends parallel to an opposite wall surface of the housing opposite to the blade root outer peripheral portion.

According to the centrifugal compressor as defined in the above (20), the blade root outer peripheral portion extends parallel to the opposite wall surface of the housing opposite to the blade root outer peripheral portion. Thus, the centrifugal force acts on the air in the vicinity of the inlet of the above-described clearance in accordance with the rotation of the impeller, making it possible to further enhance the effect of suppressing inflow of the clearance flow.

REFERENCE SIGNS LIST

2 Turbocharger
4 Centrifugal compressor
5 Air inlet
6 Impeller
7 Casing
8 Shroud portion
9 Scroll portion
10 Housing
12 Hub
12e Outer peripheral portion
13 Hub surface
13a Outer peripheral end
14a Outer peripheral end
14 Back surface
15 Blade
16 Trailing edge
16a Shroud-side end
16b Hub-side end
16c Central portion
18 Air flow passage
19 Diffuser flow passage
20 Scroll flow passage
22 Clearance
24 Blade root outer peripheral portion
26 Hub-side wall surface
27 Curved portion
28 Back-side wall surface
30 Step surface (opposite wall surface)
32 Chamfer
34 Round chamfer
35 Portion 36 Chamfer edge
38 Round chamfer edge
40 Chamfer
42 Round chamfer portion
44 Inscribed surface portion
46 Curved surface
48 Curved surface portion
50 Shroud-side wall surface

The invention claimed is:

1. An impeller of a centrifugal compressor, comprising: a hub; and at least one blade disposed on a hub surface of the hub,
  wherein a hub-side end of a trailing edge of the at least one blade
  is located radially outward of an outer peripheral portion of the hub, and
  is located on a first line extending radially outward from the hub surface of the hub, the first line extending along a direction perpendicular to an axial direction of the impeller,
  wherein a shroud-side end of the trailing edge is located radially outward of the hub-side end,
  wherein the at least one blade includes a blade root outer peripheral portion connecting the hub-side end of the trailing edge and the outer peripheral portion of the hub, the blade root outer peripheral portion being an edge of the blade, and
  wherein the blade root outer peripheral portion has a chamfer edge or a concave round chamfer edge disposed inside a clearance, the clearance formed between the hub and a housing.

2. The impeller of the centrifugal compressor according to claim 1,
  wherein the outer peripheral portion of the hub has a chamfer or a concave round chamfer formed such that the back surface is located radially outward of the hub surface.

3. A centrifugal compressor, comprising:
  the impeller according to claim 1; and
  a shroud-side wall surface and a hub-side wall surface defining a diffuser flow passage through which a fluid compressed by the impeller flows,
  wherein $0.20 \geq W2/W1$ is satisfied, where W1 is a flow-passage width of the diffuser flow passage at a position of the hub-side end of the trailing edge and
  W2 is a distance between the hub-side end of the trailing edge and the hub-side wall surface along an axial direction.

4. A centrifugal compressor, comprising:
  the impeller according to claim 1;
  a shroud-side wall surface and a hub-side wall surface defining a diffuser flow passage through which a fluid compressed by the impeller of flows; and
  a back-side wall surface opposite to the back surface of the hub,
  wherein the centrifugal compressor further comprises an opposite wall surface which connects the hub-side wall surface and the back-side wall surface and is opposite to the blade root outer peripheral portion, the opposite wall surface having a chamfer or a convex round chamfer.

5. A centrifugal compressor, comprising:
  the impeller according to claim 2;
  a shroud-side wall surface and a hub-side wall surface defining a diffuser flow passage through which a fluid compressed by the impeller flows; and
  a back-side wall surface opposite to the back surface of the hub,
  wherein the housing comprises an opposite wall surface which connects the hub-side wall surface and the back-side wall surface and is opposite to the outer peripheral portion of the hub, the opposite wall surface having a chamfer or a convex round chamfer.

6. A centrifugal compressor, comprising:
  the impeller according to claim 1; and
  the housing for accommodating a bearing for rotatably supporting the impeller,
  wherein the blade root outer peripheral portion extends parallel to an opposite wall surface of the housing opposite to the blade root outer peripheral portion.

* * * * *